(12) United States Patent
Olley et al.

(10) Patent No.: US 10,768,749 B2
(45) Date of Patent: *Sep. 8, 2020

(54) ELECTRONIC CONTROLLER HAPTIC DISPLAY WITH SIMULTANEOUS SENSING AND ACTUATION

(71) Applicants: Tanvas, Inc., Chicago, IL (US); Northwestern University, Evanston, IL (US)

(72) Inventors: Michael F. D. Olley, Lake Zurich, IL (US); Michael A. Peshkin, Evanston, IL (US); James E. Colgate, Evanston, IL (US)

(73) Assignees: NORTHWESTERN UNIVERSITY, Evanston, IL (US); TANVAS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,330

(22) Filed: Jan. 4, 2019

(65) Prior Publication Data

US 2019/0138153 A1 May 9, 2019

Related U.S. Application Data

(63) Continuation of application No. 15/117,631, filed as application No. PCT/US2015/016890 on Feb. 20, (Continued)

(51) Int. Cl.
*G06F 3/045* (2006.01)
*G06F 3/041* (2006.01)
(Continued)

(52) U.S. Cl.
CPC ............ *G06F 3/0418* (2013.01); *G06F 3/016* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

| | | | |
|---|---|---|---|
| 5,512,025 A * | 4/1996 | Dalebout | A63B 21/015 482/54 |
| 6,337,678 B1 | 1/2002 | Fish | |

(Continued)

FOREIGN PATENT DOCUMENTS

| | | |
|---|---|---|
| KR | 10-2010-0065640 | 6/2010 |
| WO | 2008093965 | 8/2008 |

(Continued)

OTHER PUBLICATIONS

Bau, et al., "Tesla Touch:Electrovibration for Touch Surfaces" User Interface Science and Technology (UIST'10), 2010, pp. 1-10, New York.

(Continued)

*Primary Examiner* — Jinsong Hu
*Assistant Examiner* — Alexander J Yi
(74) *Attorney, Agent, or Firm* — Vedder Price P.C.

(57) ABSTRACT

A haptic touch interface having simultaneous sensing and actuation including an insulating substrate having a front surface and a rear surface and one or more front surface electrodes connected to the front surface of the substrate, wherein the front surface electrodes are arranged in a first pattern. The touch interface further includes one or more rear surface electrodes connected to the rear surface of the substrate, wherein the rear surface electrodes are arranged in a second pattern and the front surface electrodes have a substantial mutual capacitance with the rear surface electrodes. Flying logic is used to control voltages applied to at least one of the front and rear surface electrodes.

17 Claims, 14 Drawing Sheets

Related U.S. Application Data 2015, now abandoned, which is a continuation-in-part of application No. 13/468,818, filed on May 10, 2012, now Pat. No. 9,733,746, and a continuation-in-part of application No. 13/468,695, filed on May 10, 2012, now Pat. No. 9,122,325.

(60) Provisional application No. 61/942,972, filed on Feb. 21, 2014.

(51) Int. Cl.
*G06F 3/044* (2006.01)
*G06F 3/01* (2006.01)

(52) U.S. Cl.
CPC .............. *G06F 2203/04104* (2013.01); *G06F 2203/04111* (2013.01)

(56) References Cited

U.S. PATENT DOCUMENTS

| | | | |
|---|---|---|---|
| 6,351,054 B1 | 2/2002 | Cabuz et al. | |
| 6,429,846 B2 | 8/2002 | Rosenberg et al. | |
| 6,970,160 B2 | 11/2005 | Mulligan et al. | |
| 7,148,875 B2 | 12/2006 | Rosenberg et al. | |
| 7,271,707 B2 | 9/2007 | Gonzales | |
| 8,552,989 B2 | 10/2013 | Hotelling et al. | |
| 8,716,991 B1* | 5/2014 | Ikriannikov | H01F 27/2804 323/272 |
| 9,639,158 B2 | 5/2017 | Levesque et al. | |
| 2003/0037776 A1 | 2/2003 | Rosenberg et al. | |
| 2003/0117175 A1 | 6/2003 | Green et al. | |
| 2003/0151597 A1 | 8/2003 | Roberts et al. | |
| 2003/0179190 A1 | 9/2003 | Franzen | |
| 2005/0173231 A1 | 8/2005 | Gonzales | |
| 2006/0209037 A1 | 9/2006 | Wang et al. | |
| 2006/0279548 A1 | 12/2006 | Geaghan | |
| 2007/0232348 A1 | 10/2007 | Tierling et al. | |
| 2007/0236450 A1 | 10/2007 | Colgate et al. | |
| 2007/0236474 A1 | 10/2007 | Ramstein | |
| 2008/0060856 A1 | 3/2008 | Shahoian et al. | |
| 2008/0061800 A1 | 3/2008 | Reynolds et al. | |
| 2008/0062143 A1 | 3/2008 | Shahoian et al. | |
| 2008/0062144 A1 | 3/2008 | Shahoian et al. | |
| 2008/0062145 A1 | 3/2008 | Shahoian et al. | |
| 2008/0068351 A1 | 3/2008 | Rosenberg et al. | |
| 2008/0129705 A1 | 6/2008 | Kim et al. | |
| 2008/0218488 A1 | 9/2008 | Yang et al. | |
| 2008/0303782 A1 | 12/2008 | Grant et al. | |
| 2009/0002328 A1 | 1/2009 | Ullrich et al. | |
| 2009/0079550 A1 | 3/2009 | Makinen | |
| 2009/0322355 A1 | 12/2009 | Day et al. | |
| 2010/0079379 A1 | 4/2010 | Demuynck et al. | |
| 2010/0085169 A1 | 4/2010 | Poupyrev et al. | |
| 2010/0141407 A1 | 6/2010 | Heubel et al. | |
| 2010/0152794 A1 | 6/2010 | Radivojevic et al. | |
| 2010/0156818 A1 | 6/2010 | Burrough et al. | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2010/0307900 A1 | 12/2010 | Choi et al. | |
| 2011/0012717 A1 | 1/2011 | Pance et al. | |
| 2011/0043447 A1 | 2/2011 | Park et al. | |
| 2011/0285667 A1 | 11/2011 | Poupyrev et al. | |
| 2012/0038559 A1 | 2/2012 | Radivojevic et al. | |
| 2012/0062516 A1 | 3/2012 | Chen et al. | |
| 2012/0068957 A1 | 3/2012 | Puskarich et al. | |
| 2012/0139864 A1 | 6/2012 | Sleeman et al. | |
| 2012/0268386 A1 | 10/2012 | Karamath et al. | |
| 2012/0268412 A1 | 10/2012 | Cruz-Hernandez et al. | |
| 2012/0274599 A1 | 11/2012 | Schediwy | |
| 2012/0286847 A1 | 11/2012 | Peshkin et al. | |
| 2012/0287068 A1 | 11/2012 | Colgate et al. | |
| 2012/0293446 A1* | 11/2012 | Crandall | G06F 3/044 345/174 |
| 2013/0044049 A1 | 2/2013 | Biggs et al. | |
| 2013/0064326 A1* | 3/2013 | Chen | H04L 25/0276 375/316 |
| 2013/0106758 A1* | 5/2013 | Radivojevic | G06F 3/044 345/174 |
| 2013/0307789 A1 | 11/2013 | Karamath et al. | |
| 2014/0375580 A1 | 12/2014 | Peshkin et al. | |

FOREIGN PATENT DOCUMENTS

| | | |
|---|---|---|
| WO | 2010033522 | 3/2010 |
| WO | 2010105001 | 9/2010 |
| WO | 2010105006 | 9/2010 |
| WO | 2010139171 | 12/2010 |

OTHER PUBLICATIONS

Biet, et al. "Implementation of tactile feedback by modifying the perceived friction" Eur. Phys. J. Appl. Phys, 2008, 43:123-135.

Biggs, et al., "Haptic Interfaces", 2002, 5:93-115, Published by Lawrence Erlbaum Associates.

Cerundolo, "Effect of Charge Migration in Electrostatic Tactile Displays" MS Thesis, Dept. of Mechanical Engineering, Northwester University, 2010.uting systems, 2009, 299-308.

Chubb, et al. "Shiver-Pad: A Device Capable of Controlling Shear Force on a Bare Finger" Third Joint Eurohaptics Conference and Symposium on Haptic Interfaces for Virtual Environment and Teleoperator Systems; 2009, 18-23.

Chubb, et al. "ShiverPaD: A Glass Haptic Surface that Produces Shear Force on a Bare Finger"; Transactions on Haptics; 2010, pp. 1-10; vol. X, No. X.

European Search Report for EP Application No. 12 781 885.4 dated Mar. 4, 2015.

Goethals, Tactile Feedback for Robot Assisted Minimally Invasive Surgery: An Overview, paper [online], Jul. 2008.

Grimnes, "Electrovibration, cutaneous sensation of microampere current" Acta. Physiol. Scand, 1983, 118:19-25.

Harrison, et al. "Providing Dynamically Changeable Physical Buttons on a Visual Display" Proc. of the 27th International Conf. on Human Factors in Computing Systems, 2009, pp. 299-308.

International Search Report and WO for PCT/US2012/037348 dated Nov. 28, 2012.

Kaczmarek, et al., "Electrotactile and Vibrotactile Displays for Sensory Substitution Systems" IEEE Transactions on Biomedical Engineering, 1991, 38(1):1-16.

Kaczmarek, "Electrotactile Display of Computer Graphics for Blind Final Report" National Eye Institute grant 5-ROI-EY10019-08, 2004, 1-20.

Kaczmarek, et al., "Polarity Effect in Electrovibration for Tactile Display" IEEE Transactions on Biomedical Engineering, 2006, 53(10):2047-2054.

Kato, et al. "Sheet-Type Braille Displays by Integrating Organic Field-Effect Transistors and Polymeric Actuators" IEEE Transactions on Electron Devices, 2007, 54(2)202-209.

Levesque, et al., "Experimental Evidence of Lateral Skin Strain During Tactile Exploration" Proc. of Eurohaptics, 2003, 1-13.

Mallinckrodt, et al., "Perception by the Skin of Electrically Induced Vibrations" Science, 1953, 118:277-278.

Minsky, et al., "Computational Haptics:The Sandpaper System for Synthesizing Texture for a Force-Feedback Display" PhD Thesis; Massachusetts Institute of Technology, 1995, 1-217, Cambridge, MA.

Pasquero, et al., "STReSS: A Practical Tactile Display System with One Millimeter Spatial Resolution and 700 Hz Refresh Rate" Proc. of Eurohaptics, 2003, 94-110.

Reznik, et al. "A Flat Rigid Plate is a Universal Planar Manipulator" IEEE International Conference on Robotics and Automaton, 1988, 1-7, Leuven, Belgium.

(56) References Cited

OTHER PUBLICATIONS

Robles-De-La-Torre, et al., "Comparing the Role of Lateral Force During Active and Passive Touch:Lateral Force and its Correlates are Inherently Ambiguous Cues for Shape Perception under Passive Touch Conditions" Proceedings of Eurohaptics, University of Edinburgh, 2002, 159-164, United Kingdom.

Robles-De-La-Torre, et al., "Force can overcome object geomery in the perception of shape through active touch" Nature, 2001, 412:445-448.

Strong, "An Electrotactile Display" IEEE Transactions on Man-Machine Systems, 1970, MMS-11:72-79.

Takasaki, M., et al. "Transparent surface acoustic wave tactile display," International Conf. on Intelligent Robots and Systems, Aug. 2005, 3354-3359.

Tang, et al., "A Microfabricated Electrostatic Haptic Display for Persons with Visual Impairments" IEEE Transactions on Rehabilitation Engineering, 1998, 6(3):241-248.

Wang, et al., "Haptic Overlay Device for Flat Panel Touch Displays" Proceedings of the 12th International Symposium on Haptic Interfaces for Virtual Environment and Teleoperator Systems 2004, 1 pg.

Watanabe, et al. "A Method for Controlling Tactile Sensation of Surface Roughness Using Ultrasonic Vibraton" IEEE International Conference on Robotics and Automation, NTT Interdisc. Research Lab, 1995, 1134-1139.

Winfield, et al. "T-PaD: Tactile Pattern Display through Variable Friction Reduction" World Haptics Conf., 2007, pp. 421-426.

Yamamoto, et al., "Electrostatic Tactile Display for Presenting Surface Roughness Sensation" ICIT, 2003, 680-684, Maribor, Slovenia.

www.senseg.com, Sep. 20, 2012, 1-2.

http://www.teslatouch.com/, Sep. 20, 2012, 1-4.

"Calculation of the Dielectric Properties of Body Tissues in the frequency range 10Hz-100GHz" Sep. 20, 2012, http://niremf.ifac.cnr.it/tissprop/htmlclie/htmlclie.htm, p. 1-3.

\* cited by examiner

ELECTRONIC CONTROLLER HAPTIC DISPLAY WITH SIMULTANEOUS SENSING AND ACTUATION

CROSS-REFERENCE TO RELATED APPLICATION

This application is a continuation of pending U.S. Nonprovisional patent application Ser. No. 15/117,631, filed Aug. 9, 2016, which is a National Stage of International application Ser. No. PCT/US2015/16890, filed Feb. 20, 2015 which claims the benefit and priority of U.S. Provisional Patent Application Ser. No. 61/942,972, filed Feb. 21, 2014, the disclosures of which are hereby incorporated herein by reference in their entirety.

CONTRACTUAL ORIGIN OF THE INVENTION

This invention was made with government support under grant numbers IIS-0964075 and IIP-1330966 awarded by the National Science Foundation. The government has certain rights in the invention.

FIELD OF THE INVENTION

The present invention generally relates to touch interfaces for surface haptic devices (SHD), and more particularly to electronic controllers for touch interfaces having simultaneous sensing and actuation that can provide multi-point haptics, which includes providing independent haptic effects experienced by separate fingers of a user.

BACKGROUND OF THE INVENTION

Touch interfaces can be found in laptop computers, gaming devices, automobile dashboards, kiosks, operating rooms, factories, automatic tellers, and a host of portable devices such as cameras and phones. Touch interfaces provide flexible interaction possibilities that discrete mechanical controls do not. But today's touch interfaces sacrifice an important part of the human experience: haptics. "Haptics" refers to the perceptual system associated with touch. Haptics lets us touch type, find a light switch in the dark, wield a knife and fork, enjoy petting a dog or holding our spouse's hand. Haptics is not just about moving one's hands, but it is about feeling things, recognizing objects (even without looking at them), and controlling the way that we interact with the world.

Haptics in the form of vibration is a familiar feature of electronic products such as pagers, cell phones, and smart phones. Although vibration has long been used as a silent ringer or alarm, it is increasingly used to provide tactile feedback to the human hand (especially the fingertips) when using a touch surface, such as a touch screen. Prior art, such as U.S. Pat. No. 6,429,846 entitled, "Haptic Feedback for Touchpads and Other Touch Controls", for instance, describe a number of hardware and software solutions for vibration-based haptic feedback. The technology is considerably more advanced than what was traditionally used in pagers. The use of piezoelectric actuators to enable high bandwidth control of vibration profiles enhances the user experience. Nonetheless, the vibration approach has certain drawbacks. For instance, the entire device vibrates so that any effect is felt in the hand holding the device as well as at the fingertip touching the touch surface or screen. Furthermore, it does not support multi-point haptics: because the entire device vibrates, each fingertip touching the screen experiences the same effect.

Recently, electrostatic actuation has been explored as a means to generate vibrations localized to the fingertip. Prior art, such as U.S. Pat. No. 7,924,144 makes use of electrostatic forces to create vibrations of the fingertip that enable one to detect a variety of textures on a touch surface. This technology has the advantage that it generates no mechanical vibrations except at the surface of the skin. While the technology also has the potential to support multi-point haptics simply by using multiple electrodes on the same surface of a screen, in practice this is difficult to do. One reason is that it is difficult to make low-resistance electrical connection to electrodes that are not near the edge of a transparent screen. Thus, of the multiple electrodes, the ones not near the edges are slow to charge. Another reason is that the haptics must co-exist with some means of sensing fingertip locations. The most common technique for multi-touch sensing is "projected capacitive" sensing, which also makes use of electrostatic charges. To minimize the interaction between the electrostatic haptics and the projected capacitance sensing, the prior art solution makes use of a single electrode for haptics, the size of the whole touch screen.

Multi-Point Haptics

A co-pending patent application by some of the present inventors (U.S. patent application Ser. No. 13/468,818, entitled Electrostatic Multi-touch Haptic Display) describes a number of ways of achieving multi-point electrostatic haptics. Certain aspects of that disclosure are noted herein as a background. For instance, the basis of electrostatic haptics is the modulation of frictional force as a result of directly affecting the normal force between the finger and a touch surface of a touch interface via an electric field. The electric field is established at the point of contact between the fingertip and the touch surface. This is accomplished by placing one or more electrodes near the touch surface of the substrate, insulating those electrodes from the fingertip with a dielectric layer. To set up an electric field, a circuit must be closed through the fingertip. There are two principal ways of doing this.

In the prior art, others have taught the method shown in FIG. 1a, which is a figure from U.S. Pat. No. 7,924,144, wherein capacitance of a finger-dielectric-electrode system is part of a circuit that is closed through a second contact at some other part of the body, which circuit may even be completed taking advantage of the relatively large capacitance of the human body. Thus, FIG. 1a shows an apparatus which implements a capacitive electrosensory interface, having an electrical circuit that is closed between two separate contact locations, wherein both of the two locations are fingertips.

The present inventors have devised an alternative method shown in FIG. 1b, which is similar to a figure from U.S. patent application Ser. No. 13/468,695, entitled Touch Interface Device And Method For Applying Controllable Shear Forces To A Human Appendage, wherein two separate electrodes E and E' (haptic devices) are covered by an insulating layer L and would be placed on a front or top surface of a substrate (not shown) at a single contact or touch location. The circuit is therefore closed through a single touch of a fingertip itself, not involving the rest of the body. This has the benefit of not requiring involvement of some other part of the body, but it has another benefit as well, which will be discussed herein.

To apply the two-electrode technique, it is necessary to create a suitable array of electrode pairs on the touch surface. As illustrated in FIG. 2, one approach to accomplish this arrangement for an apparatus, such as a mobile device 2, would be to simply tile a top surface or touch surface 4 with electrode pairs 6 that include electrodes 8 and 10. This top layer of electrodes has the advantages that electrodes 8, 10 can be placed precisely where they are needed on the surface 4 and that all electrodes can potentially be patterned from the same conductive layer. It will be appreciated that wires can be patterned from the same conductive material as the electrodes, or can be made of higher conductivity material.

However, this configuration has the disadvantage present in some prior art with respect to the need for respective thin conductive traces 14, 16 to connect to many of the electrodes, such as those that are not near an edge. Thin conductive traces 14, 16 with sufficiently low resistivity can be difficult to produce, especially if they need to be transparent to meet other design objectives. Another potential difficulty with this approach is that the electrode count may become quite large, especially as the touch surface becomes larger. If the x-axis requires N electrodes and the y-axis requires M, then the total electrode count with pairs, as shown in FIG. 2, is 2*M*N. Nonetheless, patterns like this one that tile the surface with electrode pairs may be used in certain situations, such as with devices having smaller screen sizes.

A second approach to creating an electrode array for the touch surface of an apparatus is shown in FIG. 3a and is referred to as a "Lattice." The diagram in FIG. 3a focuses on the electrode array, for ease of understanding. While a pattern in the form of a lattice network of lines of diamond-shaped electrodes is shown, such a pattern and shape of electrodes need not be used, but the emphasis is on covering the surface (here shown as being generally planar) with N*M electrodes that can serve in pairs. In this figure, electrodes 20 run along or parallel to a first axis (for example the x-axis), and electrodes 22 run along or parallel to a second axis (for example the y-axis). The region where a given y-axis electrode 22 crosses a given x-axis electrode 20 defines a two-electrode region (like that shown in FIG. 1b) where electrostatic forces can be applied to a user's skin, such as to a fingertip.

As shown in FIG. 3a, any electrode 20 (x-axis) and electrode 22 (y-axis) can form a pair. If different voltages are applied to, for example, the electrodes 20 and 22, then an intersection of the respective electrodes 20, 22 becomes an active region or location where a finger will experience increased electrostatic force. In practice, AC voltages may be used and maximum electrostatic forces are produced when the applied voltages are 180 degrees out of phase with one another.

The magnitude of the electrostatic force can be modulated in various ways. As a few examples, one approach is to change the magnitude of the voltages applied to the electrodes. Another is to vary the duty cycle of the voltage waveforms applied to the electrodes. Yet another is to control applied voltage or current based on a measure of the electrical charge on the electrodes 20, 22. A further approach is to vary the phase relationship between the voltages on the two electrodes 20, 22. The electrostatic force is maximized when the voltages on the two electrodes 20, 22 are completely out-of-phase with one another, and minimized when they are in phase because the circuit then is no longer closed locally through the touch, contact or engagement of a user's finger, such as at a fingertip, but must be closed through the capacitance of the rest of the user's body. If $C_f$ is the capacitance from the finger to the electrodes and $C_b$ is the capacitance from the rest of the body to the device ground, then the attenuation factor (ratio of force when touching in-phase electrodes to force when touching out-of-phase electrodes) is:

$$\text{Attenuation} = \left(\frac{C_b}{C_b + C_f}\right)^2$$

Normally, $C_f$ is significantly larger than $C_b$ (at least by a factor of 5), so the attenuation factor is quite significant: more than an order of magnitude.

A pattern in the form of a Lattice network or configuration also supports multi-point haptics to a certain extent. This is illustrated in FIG. 3b, which shows a pattern having a lattice network of electrodes that further includes electrodes 24 that run along or parallel to a first axis (for example the x-axis), and electrodes 26 that run along or parallel to a second axis (for example the y-axis), and in which the intersections between electrodes 20 and 22, as well as trace intersections between electrodes 24 and 26, each are used to define or control the electrostatic force acting on two respective fingers, with a first fingertip F represented by a first oval and a second fingertip FF represented by a second oval. There are, however, finger locations where this multi-point capability may break down. If, for instance, two fingertips lie on the same electrode, then it is difficult to apply very different forces to the two fingers. The reason for this is that the finger-to-finger impedance through the user's body is quite small relative to the electrode-to-finger impedance ($1/\omega C_f$) where $\omega$ is the frequency of AC excitation. Thus, for instance, a second finger on an active x-axis electrode still has the benefit of the active y-axis electrode under the first fingertip. Note that in the example, x and y could be reversed. To ensure that the force on each finger is independent of the force on each other finger, it is necessary that they be parts of different circuits. As described above, this could be accomplished by the arrangement in FIG. 2, but with drawbacks.

Multi-Touch Sensing

Most modern multi-touch sensors are of the "projected capacitance" (pCap) variety. These sensors generally lie in a planar orientation and work on the basis of mutual capacitance between a set of transmit (Tx) electrodes that run along or parallel to a first axis (for example the y-axis) and a set of receive (Rx) electrodes that run along or parallel to a second axis (for example the x-axis), and thus are arranged orthogonally to one another. While there are many different electrode patterns in use, the most common for pCap sensors is the interlocked diamond pattern shown in FIG. 4. The Tx and Rx lines are either on different layers, or they are on the same layer, but bridges are formed where the lines would otherwise intersect, so that no contact occurs between a Tx line and any Rx line.

There is a capacitive coupling from each Tx line to each Rx line, and the amount of this mutual capacitance is reduced if a finger is placed near the intersection of the two. The finger in effect "steals" some of the electric field lines that would otherwise have reached the Rx line, as represented in FIG. 5a, from Zimmerman et al., 1995. This "human shunt" is a standard mode for pCap sensing. By measuring the mutual capacitance (for which there are numerous known techniques) for each Tx-Rx pair, and interpolating the results, the centroids of the respective fingers can be located.

The same electrode pattern also can be used to measure finger locations using a self-capacitance technique, rather than mutual capacitance. Under this approach the perpendicular lines (Rx and Tx lines) are treated equivalently. Each electrode (whether in an Rx or Tx line) has a capacitance to ground, and this capacitance is increased when a finger is brought nearby. That makes it particularly easy to detect that a finger is somewhere along any given line. X and Y coordinates are found separately by querying both the x-axis Tx and y-axis Rx electrode lines. The limitation of this approach is that it does not support multi-touch sensing very well. One must consider what happens when two fingers are placed on the touch surface. In general, two x-axis Tx lines of electrodes and two y-axis Rx lines of electrodes will respond. But those lines cross at four points, for example (x1,y1) (x1,y2) (x2,y1) (x2,y2), not two points. Two locations are correct and two other locations are misidentifications or "ghosts." With such as system, there is not a simple way to disambiguate the actual fingers from the ghosts.

SUMMARY OF THE INVENTION

The purpose and advantages of the disclosed subject matter will be set forth in and apparent from the description and drawings that follow, as well as will be learned by practice of the claimed subject matter. The present disclosure generally provides systems and methods having electronic controllers for touch interfaces that provide for simultaneous sensing and actuation that facilitate multi-point haptics.

The present disclosure generally provides novel and non-obvious systems and methods for producing multi-point haptics, which the present inventors term "simultaneous sensing and actuation" (SSA). In one example, the present disclosure makes use of two layers of electrodes: a top layer (near the touch surface of an insulating substrate or sheet) for haptics (referred to herein as haptic devices), and a bottom or rear layer, which refers herein to a bottom, rear or deeper layer (attached to the bottom or rear surface of the insulating substrate or sheet and/or located at a deeper layer within the touch interface device relative to the top layer) for reliable sensing (referred to herein as sensing devices). However, the top electrodes may also be used for sensing, or optionally a deeper layer of electrodes may be used for the sensing. The two electrode sets have substantially the same pattern as one another. These are referred to herein as "mirrored electrodes." In a further example, the present disclosure makes use of a single array of electrodes disposed on the front surface of a touch substrate that may serve as both surface haptics devices and sensing devices.

In a first aspect, the present disclosure presents a touch interface having simultaneous sensing and actuation comprising: an insulating substrate; one or more electrodes connected to a front surface of the substrate, wherein the front surface electrodes are arranged in a pattern; one or more electrodes connected to a rear surface of the substrate or being located at a layer that is deeper relative to the front surface, wherein the rear surface or deeper layer electrodes are aligned with and arranged in a substantially similar pattern to the pattern of the one or more front surface electrodes; and wherein a touch of the substrate capacitively couples respective front surface electrodes and rear surface or deeper layer electrodes.

In a second aspect, the disclosure presents a touch interface having simultaneous sensing and actuation comprising: an insulating substrate; one or more electrodes connected to a front surface of the substrate, wherein the front surface electrodes are arranged in a pattern; and wherein the front surface electrodes are constructed of a material that when scratched becomes electrically inactivated by chemical change to the exposed electrode material.

In a third aspect, the disclosure presents a touch interface having simultaneous sensing and actuation comprising: an insulating substrate; one or more electrodes connected to a front surface of the substrate, wherein the front surface electrodes are arranged in a pattern; and wherein the front surface electrodes are configured in a control system that provides electronic current limiters that prevent perceptible conducted currents to a finger.

In a fourth aspect, the disclosure presents a haptic touch interface having simultaneous sensing and actuation comprising: an insulating substrate; one or more electrodes connected to a front surface of the substrate, wherein the front surface electrodes are arranged in a pattern; and wherein positive and negative voltages are applied alternately to at least one front surface electrode.

In a fifth aspect, the disclosure presents a haptic touch interface having simultaneous sensing and actuation comprising: an insulating substrate; one or more electrodes connected to a front surface of the substrate, wherein the front surface electrodes are arranged in a pattern; and wherein flying logic is used to control actuation voltages to the front surface electrodes.

In a sixth aspect, the disclosure presents a touch interface having simultaneous sensing and actuation comprising; an insulating substrate; one or more electrodes connected to a front surface of the substrate, wherein the front surface electrodes are arranged in a pattern; and wherein a charge that passes in the course of haptic actuation is used to estimate the capacitance of at least one front surface electrode.

In a seventh aspect, the disclosure presents a touch interface having simultaneous sensing and actuation comprising: an insulating substrate; one or more electrodes connected to a front surface of the substrate, wherein the front surface electrodes are arranged in a pattern; and wherein both positive and negative actuation supply voltages are derived from a single converter, wherein a sum of magnitudes of positive and negative actuation supply voltages is regulated.

In an eighth aspect, the disclosure presents a method of finger position sensing on a touch interface wherein actual touch positions are distinguished from ghost touch positions by the use of fast sensing signals, comprising the steps of: providing a touch interface having an insulating substrate and one or more electrodes connected to a front surface of the substrate, wherein the front surface electrodes are arranged in a pattern, and one or more electrodes are connected to a rear surface of the substrate, wherein the rear surface electrodes are aligned with and arranged in a substantially similar pattern to the pattern of the one or more front surface electrodes; and providing fast sensing signals to the rear surface electrodes to measure capacitance to distinguish actual touch positions from ghost touch positions.

It will be appreciated that touch interfaces disclosed herein provide strong capacitive coupling between each surface haptic device connected to the front surface of the substrate and each respective sensing device aligned therewith and connected to the rear surface of the substrate. Also, this strong capacitive coupling enables changes in capacitance associated with the surface haptic devices (due, for instance, to touch by a finger) to be detected from the sensing devices.

It further will be appreciated that for touch interfaces disclosed herein the one or more electrodes that provide electrostatic actuation for haptic effects also may provide capacitance-based sensing of finger location on the front surface of the substrate.

It is to be understood that both the foregoing general description and the following detailed description are exemplary and provided for purposes of explanation only, and are not restrictive of the subject matter claimed. Further features and objects of the present disclosure will become more fully apparent from the following detailed description, taken with the following drawings, and from the appended claims.

BRIEF DESCRIPTION OF THE DRAWINGS

In describing the example embodiments, reference is made to the accompanying drawing figures wherein like parts have like reference numerals, and wherein.

It should be understood that the drawings are not to scale. While some mechanical details of a touch interface device, including details of fastening means and other plan and section views of the particular arrangements, have not been included, such details are considered well within the comprehension of those of skill in the art in light of the present disclosure. It also should be understood that the present invention is not limited to the example embodiments illustrated and that the examples are shown in simplified form, so as to focus on the principles systems and methods and to avoid including structures that are not necessary to the disclosure and that would over complicate the drawings.

DETAILED DESCRIPTION OF THE INVENTION

The present disclosure provides several examples relating to touch interface devices that are intended to provide multi-point haptics by use of simultaneous sensing and actuation (SSA) in a surface haptic device (SHD), and electronic controllers therefor. The touch interface devices include a substrate to which electrodes are connected, and a controller operably connected with the electrodes for generating haptic effects and sensing finger location. A controller may utilize any of the approaches disclosed herein and be configured to operate with any of the patterns of electrodes. In one example, the multi-point haptics having simultaneous sensing and actuation may be facilitated by using mirrored electrodes. However, it has been discovered that the methods of SSA and ghost disambiguation taught herein benefit from but do not require use of mirrored electrodes. Indeed, it will be appreciated that a system and methods for providing a touch interface of the present disclosure generally may be embodied within numerous configurations and for use with various devices. One further example of which includes use of a single array of electrodes disposed on the front or top surface of the touch substrate, which may serve as both surface haptics devices and sensing devices. The purposes and advantages of the disclosed subject matter will be set forth in and apparent from the description and drawings that follow, as well as will be learned by practice of the claimed subject matter.

As noted previously, to ensure that the force on each finger is independent of the force on each other finger, it is necessary that they be parts of different circuits. The present disclosure teaches a further advantageous method of a guaranteeing independence for at least two fingers by use of at least tri-intersection of electrodes on the top surface. In addition, the disclosure teaches a system having a failure mode that uses mirrored electrodes by which, if a haptic device is scratched, the haptics may stop functioning, but the capacitive sensing continues to operate.

Figure 5A:
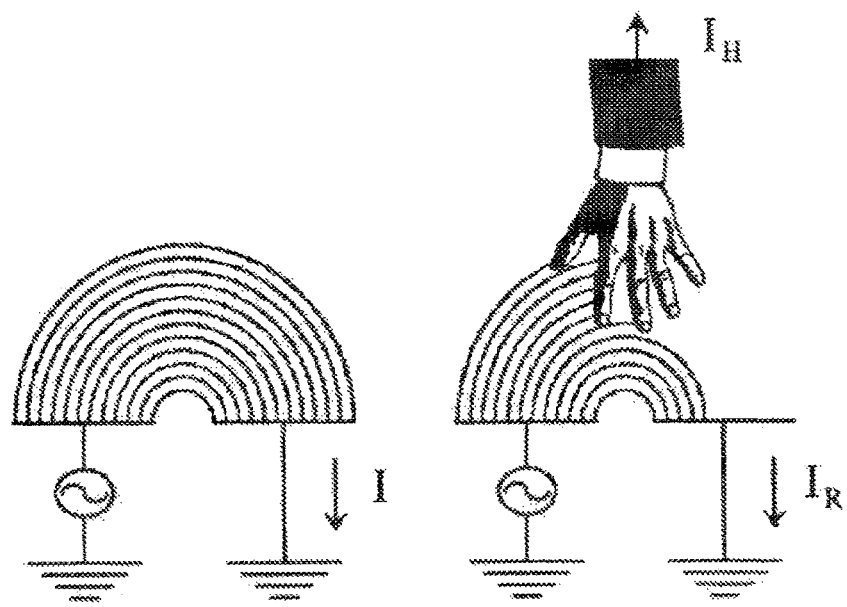
FIG. 5a is a diagram that represents "the human shunt" as a standard mode for pCap sensing.
Figure 5B:
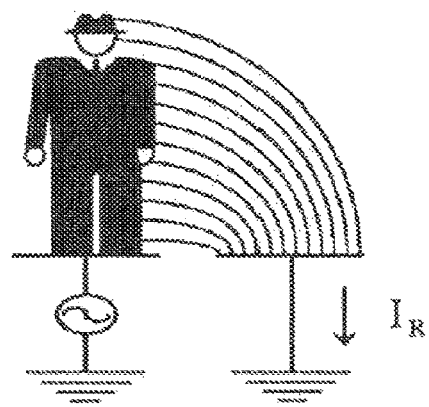
FIG. 5b is a diagram that represents "the human transmitter" as a secondary effect for pCap sensing, but may be a dominant effect when the electrodes are on the front surface of a substrate.

With respect to systems using mutual capacitance, it is important to understand that the finger actually produces two effects when brought near an intersection of Tx-Rx lines of electrodes. These are illustrated in Zimmerman et al., 1995, which referred to the effect in FIG. 5a as "the human shunt" and the effect in FIG. 5b as "the human transmitter." The first effect is the normal pCap model because the second effect is quite small when the electrodes are separated from the fingertip by more than about 0.1 mm of glass. Electrostatic haptics, however, places electrodes on the front or top (touch) surface of the glass substrate. In preferred embodiments, those electrodes are separated from the finger by only a thin layer of dielectric, typically on the order of microns. The use of such a thin protective layer allows suitably large electric field strengths to be developed at reasonably low voltages (e.g., less than 100 volts) for the purpose of haptics. This situation greatly increases the importance of transmission relative to shunting, such that it becomes the dominant effect when the electrodes are on the front surface of the glass substrate. The fingertip in effect becomes a switch that (almost) directly connects the Tx line electrodes to the Rx line electrodes.

There are several implications of this reversal of effect magnitudes when insulators are thin. On the one hand, the transmitter effect is quite large, which bodes well for achieving a high signal-to-noise ratio (SNR), presuming that the front or top surface electrodes are used for sensing. On the other hand, the transmitter effect does not lend itself to multi-touch sensing because transmission occurs not just through one fingertip, but from one fingertip to the next due to the low finger-to-finger impedance through the body. A more fundamental issue, however, is whether one chooses to use the front-surface electrodes for sensing at all.

The potential difficulty with front or top surface electrodes is that they are not as well protected as rear or bottom surface or deeper layer electrodes. In a typical pCap sensor, the electrodes (sensing devices) are placed behind a substrate such as a sheet of glass or clear plastic (i.e., they are "rear-surface", or on an even deeper layer). The glass or plastic serves as a so-called "cover lens" and is a protective element that keeps the electrodes from being damaged by abrasion or scratches. As mentioned above, however, the electrodes responsible for haptics (haptic devices) need to be on the front surface in order to produce a large tactile effect using a modest voltage. To protect these electrodes, it is advisable to use a very durable dielectric covering or layer.

The inventors have discovered that it is possible to use a single layer of electrodes as both haptics devices and sensing devices. Thus, patterns of electrodes such as those shown in FIGS. 2, 3a, 3b, 4 and 8a-12 could be employed and used both as haptics devices and as sensing devices. The protective materials may provide adequate protection for many touch interfaces, however, they cannot absolutely guarantee that no scratches will occur to the top surface electrodes. Some common materials such as quartz and hardened steel may be hard enough to cause scratches when in contact with such protective materials. If a scratch occurs, one failure mode that may prove acceptable is for haptics to stop functioning, but for capacitive sensing to keep on operating. Such systems, however, do present compromises that leave a further need in the art for an improved way of providing multi-point haptics.

For improved protection of sensing devices, it may be desirable to use the pCap practice of placing sensor electrodes underneath the cover glass. However, this presents a challenge to achieve high-quality multi-touch sensing on a protected layer, in spite of possible screening by electrodes used for haptics on a surface layer. This is achieved by the use of "mirrored electrodes." In this context, the term "mirrored" does not refer to a reflective surface finish. Rather, mirrored electrodes is the use of two layers of electrodes: a top layer {near the touch surface of an insulating substrate or sheet) for haptics {referred to herein as haptic devices), and a bottom layer (attached to the bottom surface of the insulating substrate or sheet) for sensing (referred to herein as sensing devices). The two sets of electrodes have substantially the same pattern as one another, and thus in a general sense can be said to present a mirror image of each other. Thus, touch interfaces using mirrored electrodes have both top and bottom layers of electrodes that are in substantially similar patterns, where the patterns may include for example, those shown in FIGS. 2, 3a, 3b, 4 and 8a-12.

Simultaneous Sensing and Actuation

Figure 6:
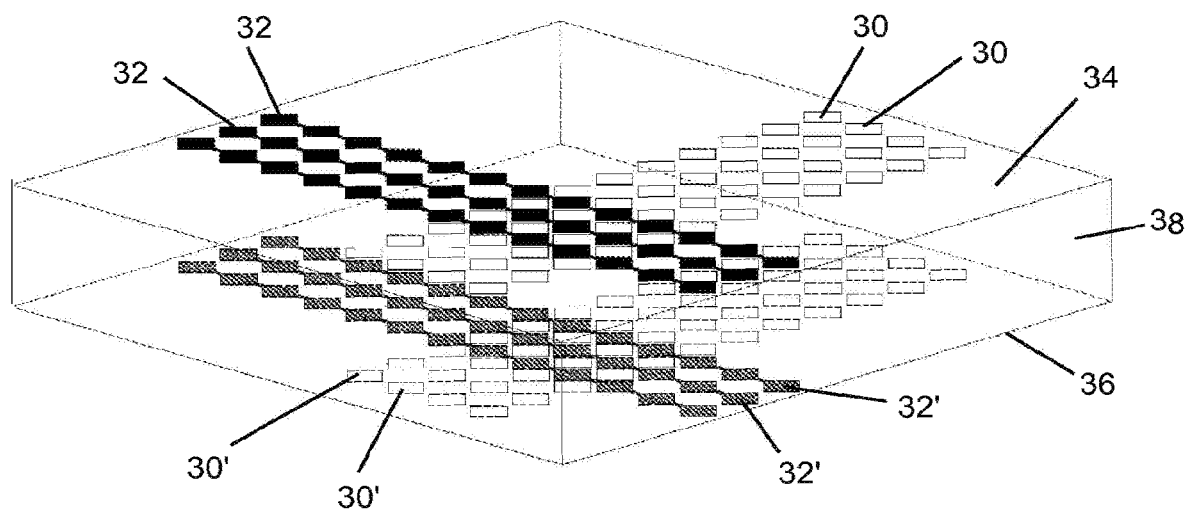
FIG. 6 is a simplified diagram of a touch interface that represents use of "mirrored electrodes" with a front or top (haptic) layer of electrodes in a pattern and a rear, bottom or deeper (sensing) layer of electrodes being in a substantially similar pattern and, for ease of viewing, the vertical separation between the layers is greatly exaggerated, only a few lines of electrodes are shown and in a very simplistic form.

Thus, as illustrated in FIG. 6, one aspect of the present disclosure is the use of mirrored electrodes, which include substantially identical, aligned, electrode patterns with electrodes 30, 32 (haptic devices) on the front or top (touch) surface 34 and electrodes 30', 32' (sensing devices) on the rear or bottom surface 36 of an insulating substrate 38 or sheet.

The concept of mirroring can be extended to any electrode pattern, including for instance, as previously noted, the patterns in FIGS. 2, 3a, 3b, 4 and 8a-12. The patterns also may be applied to any portion of a surface, from discrete or isolated locations to the entire surface. For instance, with the pattern shown in FIG. 6, the mirrored arrangement provides a strong capacitive coupling between each front or top (touch) surface electrode 30, 32 and its mirrored or similarly arranged rear or bottom surface electrode 30', 32'. In general, mirroring should work any time that the glass or other substrate thickness is significantly less than the typical electrode width, and even if the substrate is not planar. For instance, the electrodes may be 5 mm wide when using a glass substrate 1 mm thick.

As a result of mirroring, a signal sent to a bottom electrode (sensing device) will induce a signal on the top surface electrode (haptic device) above it, even if the top surface electrode has been transected by one or more scratches. Thus, this method does not depend significantly on the resistance of the top surface (haptic) electrodes, and therefore, the bottom surface (sensing) electrodes continue to work even if the top surface electrodes are compromised by scratches. If top and bottom surface electrodes overlay each other in a one-to-one relationship (either partially or completely), then there should be minimal mixing of signals between adjacent electrodes. In particular, the top surface electrodes can be used for haptic actuation, without those top surface electrodes spanning across two or more lower surface sensing electrodes and thus mixing or blurring the desired sensing performance of the lower electrodes. Indeed, the mirrored arrangement offers several interesting possibilities.

Figure 7A:
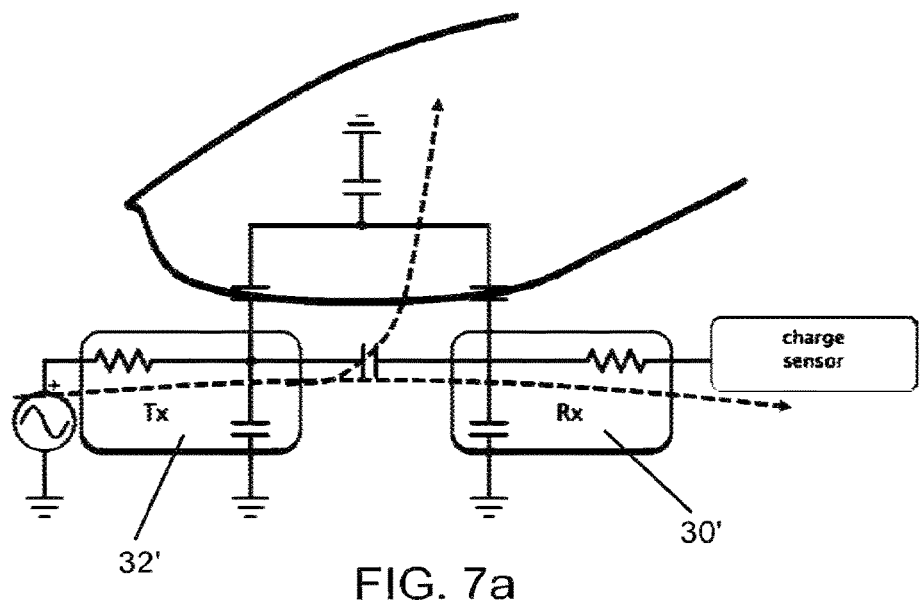
FIG. 7a is a diagram of a standard or typical pCap electrical arrangement where rounded rectangles represent rear or bottom surface or deeper layer (sensing) electrodes.
Figure 7B:
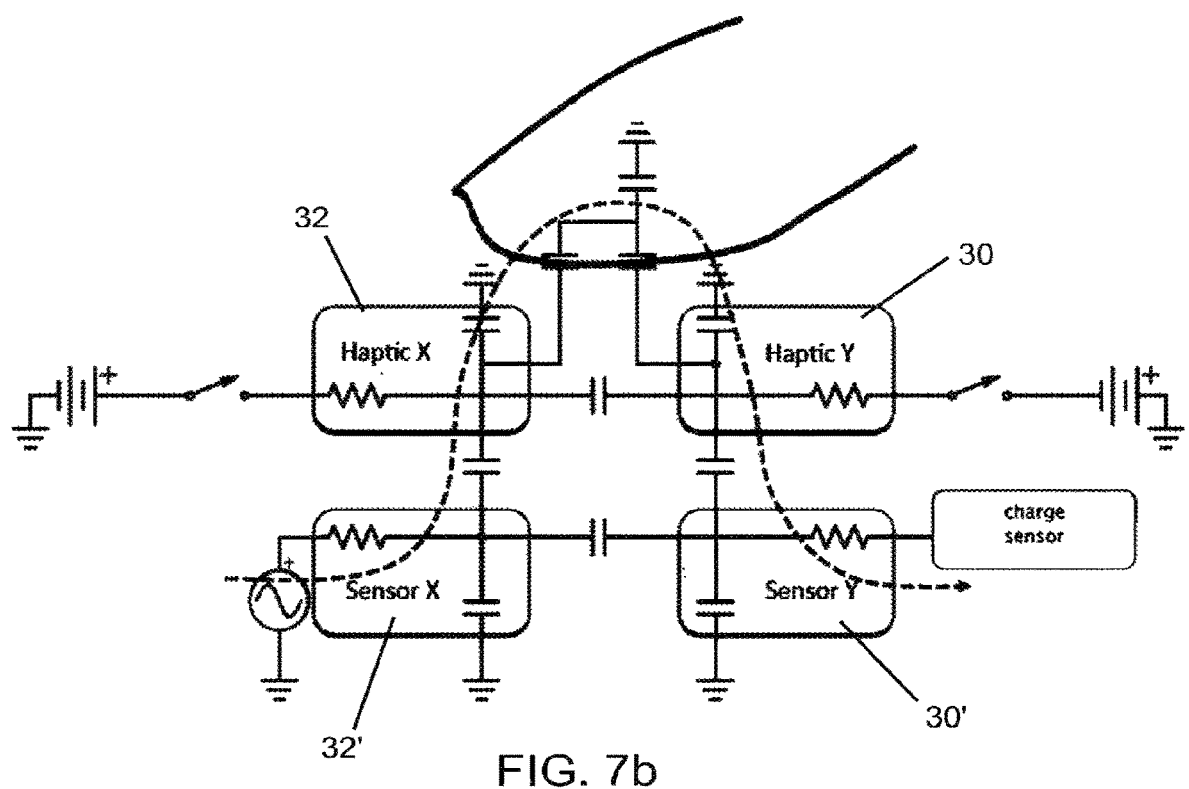
FIG. 7b is a diagram of a mirrored electrodes electrical arrangement where the finger acts as a transmitter.

One possibility is to use some of the bottom lines of electrodes 32' as (transmit) Tx electrodes and others, such as electrodes 30' as (receive) Rx electrodes, as is normally done in pCap sensing. A finger placed above a particular location of a Tx-Rx junction should produce a large signal regardless of the presence of scratches on the top surface. This is illustrated in FIG. 7*b* where the finger acts as a transmitter, which can be compared to a typical or standard pCap configuration shown in FIG. 7*a* where the finger acts as a shunt. For a wide range of parameter values, this arrangement produces a strong effect with better signal-to-noise ratio (SNR) than typical pCap. This improved SNR offers several potential benefits, such as faster sensing (especially useful for haptics), higher resolution, or lower power consumption.

Unfortunately, the strong effect just described is due to the transmitting phenomenon, not to the shunting one. Because transmitting can also occur via a signal from one finger to another, modeling thus far suggests that ghosting, or misidentification of finger touches, may occur. Suppose that two fingers are placed on the surface at (x1,y1) and (x2,y2). A signal sent along x1 will produce a result at both y1 and y2. Thus, (x1,y2) represents a ghost finger location. Accordingly, further approaches may be utilized to achieve high-resolution multi-touch haptics without ghosting.

Multi-Touch Sensing with Mirrored Electrodes

From the above discussion, mirrored front or top (haptics) and rear or bottom (sensing) electrodes serve to "project" the bottom activation pattern to the top. Moreover, strong capacitive coupling from the top electrodes to the finger should allow significantly higher SNR than with conventional pCap sensing. Unfortunately, ghosts or misidentifications of finger touches can appear because of the enhanced "human transmitter" effect (in contrast to the "human shunt" effect that dominates for back-surface electrodes), in combination with the significant signal conductivity from finger to finger. This same difficulty will occur if the top electrodes are used directly for sensing as well as haptics. The present disclosure, however, provides newly developed approaches to multi-touch haptics, overcoming this disadvantage. Four such methods, each with its own strengths, are disclosed herein.

Method 1: Tissue Resistivity

Because of the resistance from one finger to the next, the ghosts or misidentifications are in fact of lesser intensity than the actual fingers. The magnitude of the intensity difference is characterized by an RC time constant determined by the capacitance from the top surface electrode to the fingertip (~1 nF) and the body's internal resistance from one fingertip to the next (estimated at 100 to 1000 ohms). This time constant is longer than the time constant for querying an electrode, which is governed by the resistance of the electrode (assuming Indium-Tin Oxide (ITO), about 1-10 kΩ) and the capacitance of that electrode to ground (about 100 pF). If the time constant for finger-to-finger transmission is significantly longer than that for querying an electrode, it is possible to distinguish individual finger touches by using an excitation signal that would be too fast to transmit efficiently through the fingers. Doing so will, in effect, isolate one finger from the other finger(s). The timing constraints are challenging given the resistance of ITO electrodes, but the approach becomes more promising if ITO is replaced by another material having lower resistance. Several such materials, including silver nanowires and graphene, are known in the art. Another approach is to use thicker layers of ITO, which have lower resistivity. Helpfully, it is not necessary that the time constant for finger-to-finger transmission actually be longer than that for querying an electrode. It may be adequate that the time constant diminish the ghost signals sufficiently to distinguish them from the actual finger touch signals.

Method 2: Mutual Capacitance

Although the human transmitter effect is stronger than the human shunt effect for the electrodes directly beneath the finger, this is not necessarily true for other nearby electrodes. For other pairs of top surface electrodes that are near to the finger, but not directly beneath it, the mutual capacitance will be diminished. Thus, there will be a pattern of reduced mutual capacitance near to an actual finger touch, but not near to a ghost. Candidate finger touches can therefore be identified using self-capacitance, and disambiguated from ghosts by using mutual capacitance of nearby electrode intersections.

Method 3: Computational

By collecting the whole matrix of mutual signal intensities, the linear system can be inverted to produce a solution for the location of all the fingers and the cross-coupling efficiencies that interconnect them through the user's hand and body, in order to match the observed intensities. This holistic solution has much superior noise immunity and is scalable to large numbers of fingers. Another benefit of this method is the determination of not only the finger locations but also their cross-coupling efficiencies. For instance, fingers of the same hand cross-couple more strongly than fingers belonging to opposite hands. Being able to distinguish fingers by hand suggests fascinating user interface possibilities. Additionally, and also promising novel applications, the fingers of a second user simultaneously touching the same screen, are plainly distinguishable by their much weaker cross-coupling to the first user's fingers.

Method 4: Tri-Intersection

Figure 8A:
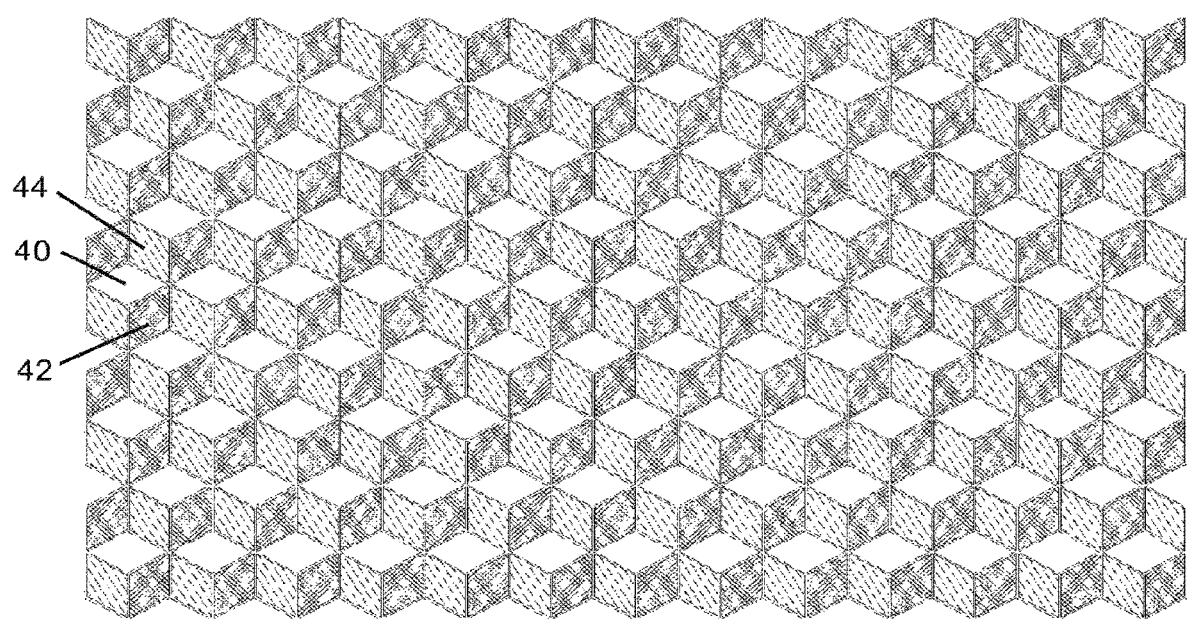
FIG. 8a is a diagram of electrodes having three-fold symmetry.
Figure 8B:
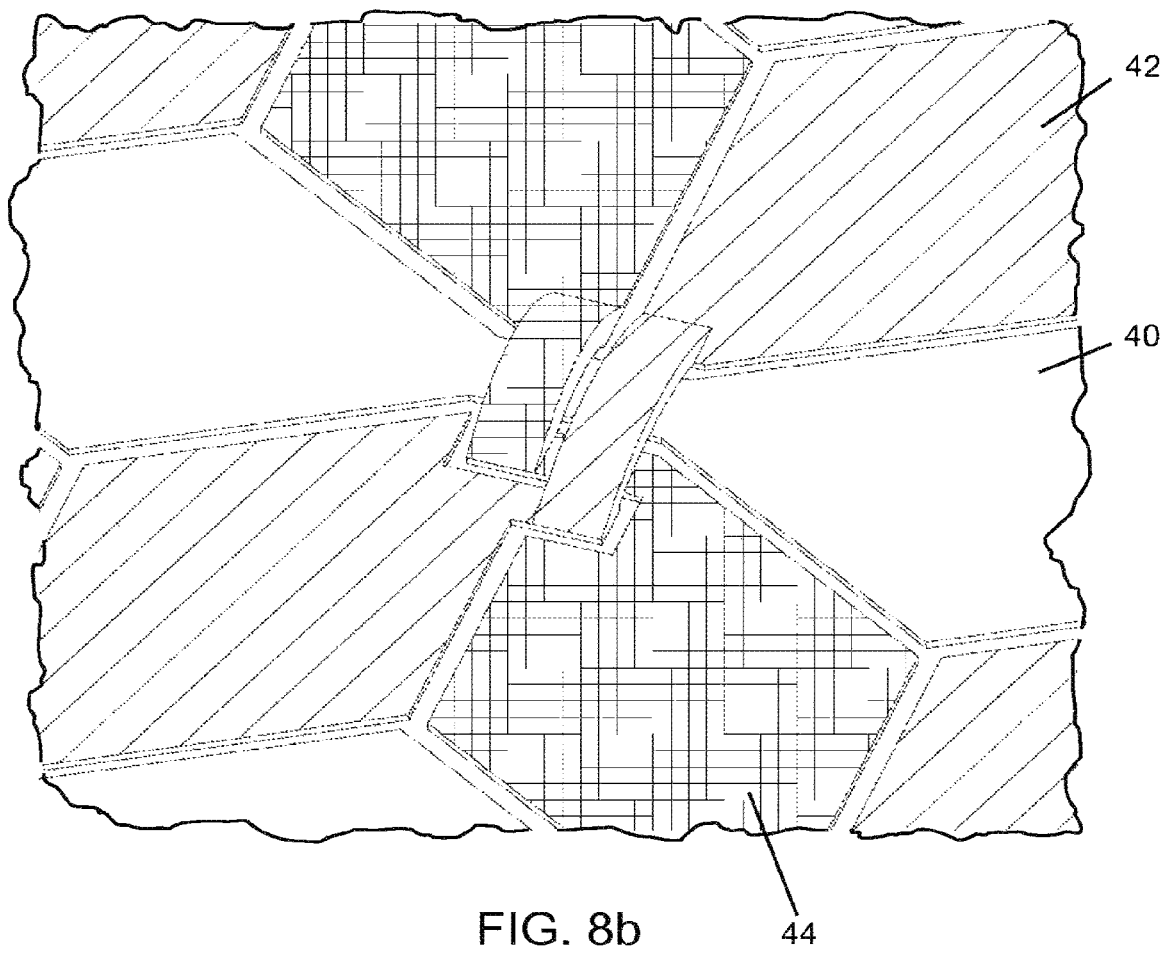
FIG. 8b is a diagram showing a bridging technique for electrodes of FIG. 8a having three-fold symmetry and that requires the same processing steps as needed for interlocked diamond electrode patterns.

A third set of mirrored electrodes, as shown in FIGS. 8*a* and 8*b*, offers another route to disambiguation. The method associates a finger touch of a touch screen with locations where three electrodes 40, 42, 44, not just two, intersect or are positioned immediately opposed to each other. This will be referred to herein as a tri-intersection and it would include bridging for the respective lines of electrodes to avoid actual intersection of the electrodes themselves. As will be explained, ghosts may still occur, but will not persist when the fingers are actually moving.

When introducing a third set of electrodes, many geometries are possible. FIG. 8*a* shows a preferred embodiment with three-fold symmetry. Another geometry would be one based on the standard interlocked diamonds (FIG. 4), but with a diagonal set of electrodes as well. With any three-electrode geometry, a consideration would be how to handle bridges. FIG. 8*b* shows that it is possible to provide the necessary bridges without any additional processing steps.

Figure 9A:
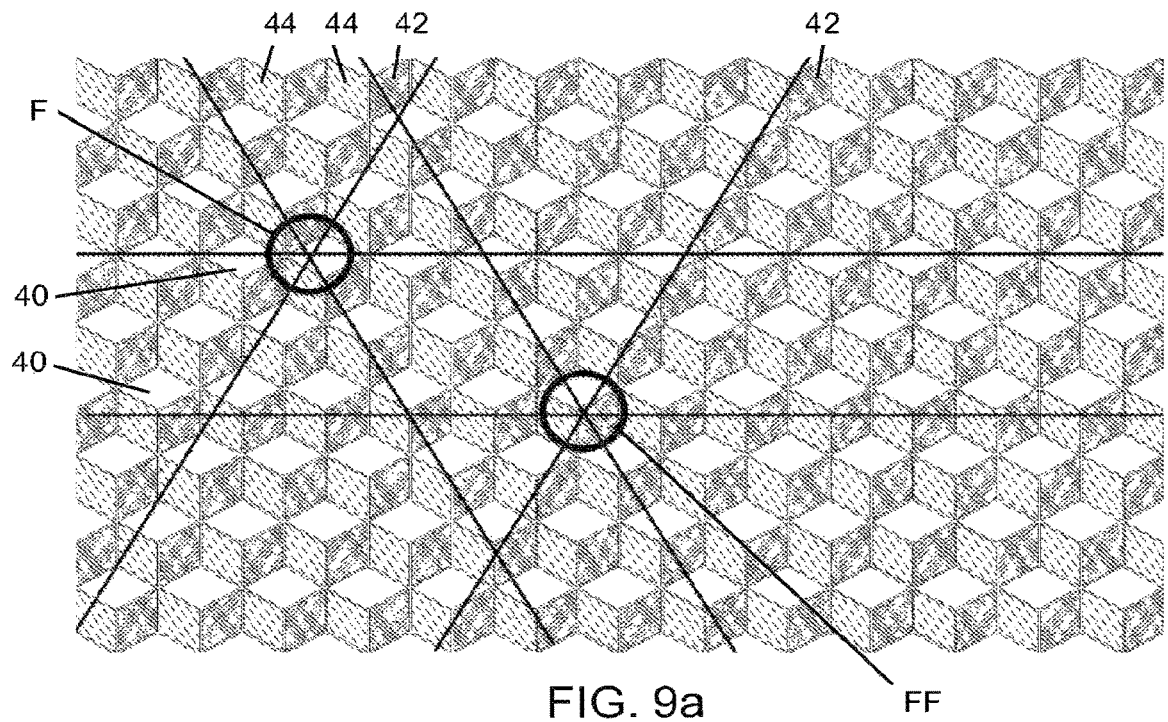
FIG. 9a is a diagram wherein circles represent finger touches and showing that, with two fingers and three-fold symmetry, a misidentification or "ghost" cannot occur because such as ghost would require three "live" electrodes all of which must cross at one location.
Figure 9B:
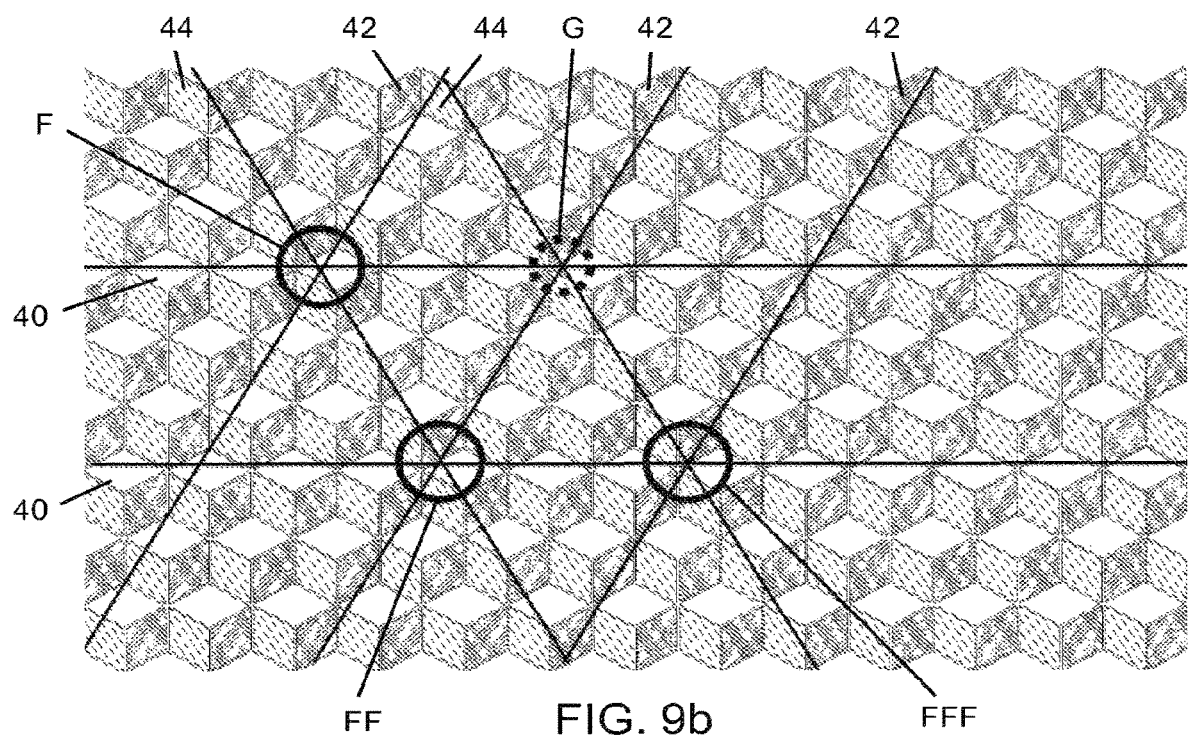
FIG. 9b is a diagram similar to that of FIG. 9a but showing that, with three fingers and three-fold symmetry, a ghost can occur only in certain configurations.
Figure 9C:
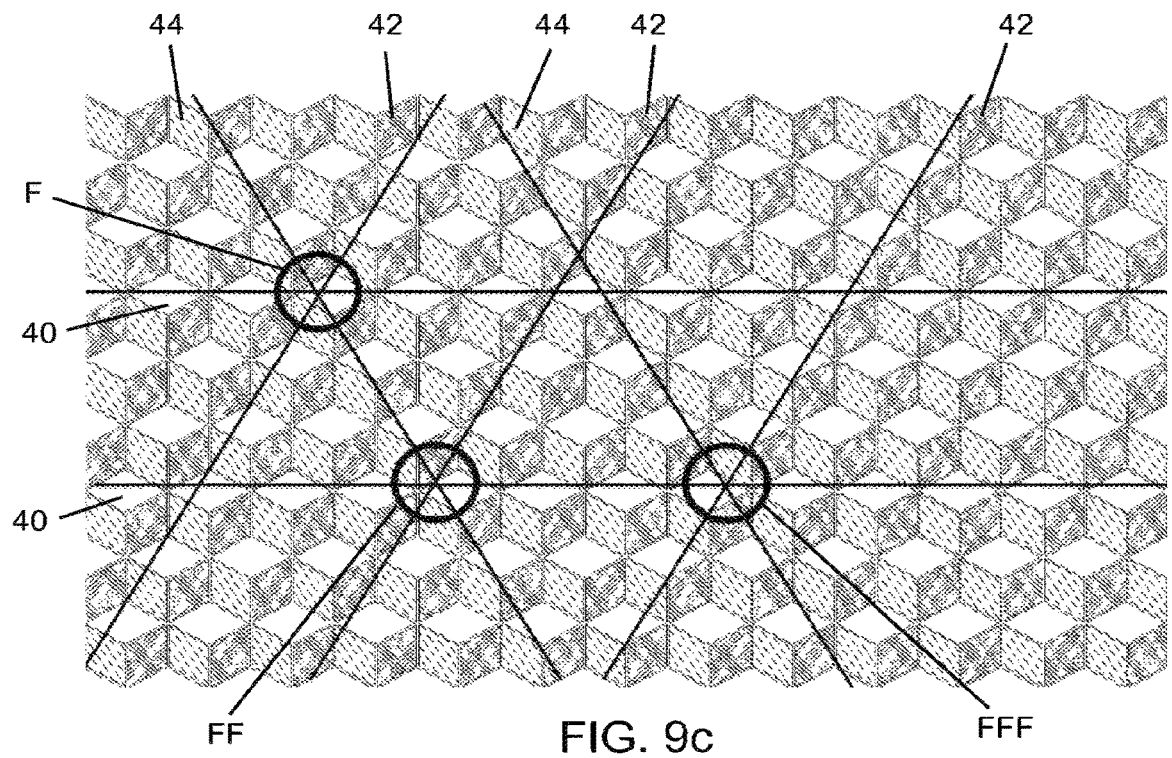
FIG. 9c is a diagram similar to that of FIG. 9b but showing that, if one of the three fingers moves just a small amount, with three-fold symmetry, the ghost disappears.

The advantages of three axes are further illustrated in FIGS. 9*a*-9*c*. If a finger touch is present (represented by a first circle F), then three electrodes 40, 42, 44, all of which cross at the location of the finger touch, should report a change in self-capacitance. As illustrated in FIG. 9a, if two finger touches are present (represented by a first circle F and second circle FF), no misidentification or ghosting is possible.

As illustrated in FIG. 9b, if three finger touches are present (represented by a first circle F, a second circle FF and a third circle FFF), misidentification or ghosting is possible, as represented by the dashed circle G, but only for certain finger touch configurations (FIG. 9b). One should consider, however, that when touching the surface of the touch interface, fingers are normally in motion or moving across the surface. Thus, misidentifications or ghosts G would tend to appear and disappear, as with FIG. 9c where a small amount of movement of one of the fingers (FFF) results in a disappearing ghost. Fortunately, a software solution for identifying and discarding ghost finger touches should be able to address this situation, with at least two approaches described herein.

The first approach is based on mutual capacitance. In the first approach, one axis of electrodes (e.g., the x-axis in FIGS. 8a-8b and 9a-9c) would be treated as transmit Tx electrodes (haptic devices). Along each Tx line are a series of "candidate" locations, defined by the intersection of pairs of electrodes, one from each other axis. (There are actually some of these on one side of the Tx line and some on the other, but that is a level of detail we will ignore for purposes of exposition.) Thus, given a Tx line of electrodes, there are two Rx lines associated with each location. These signals can be summed to produce a signal strength for each location, and a full map can then be produced by interpolation. Finger touch misidentifications or ghosts would be of reduced magnitude for two reasons: finger resistance and imperfect alignment (most of the time). A simple temporal filter—adding up the intensities for several samples—would further reduce ghost magnitude whenever fingers are moving across the surface of the interface device.

Figure 10A:
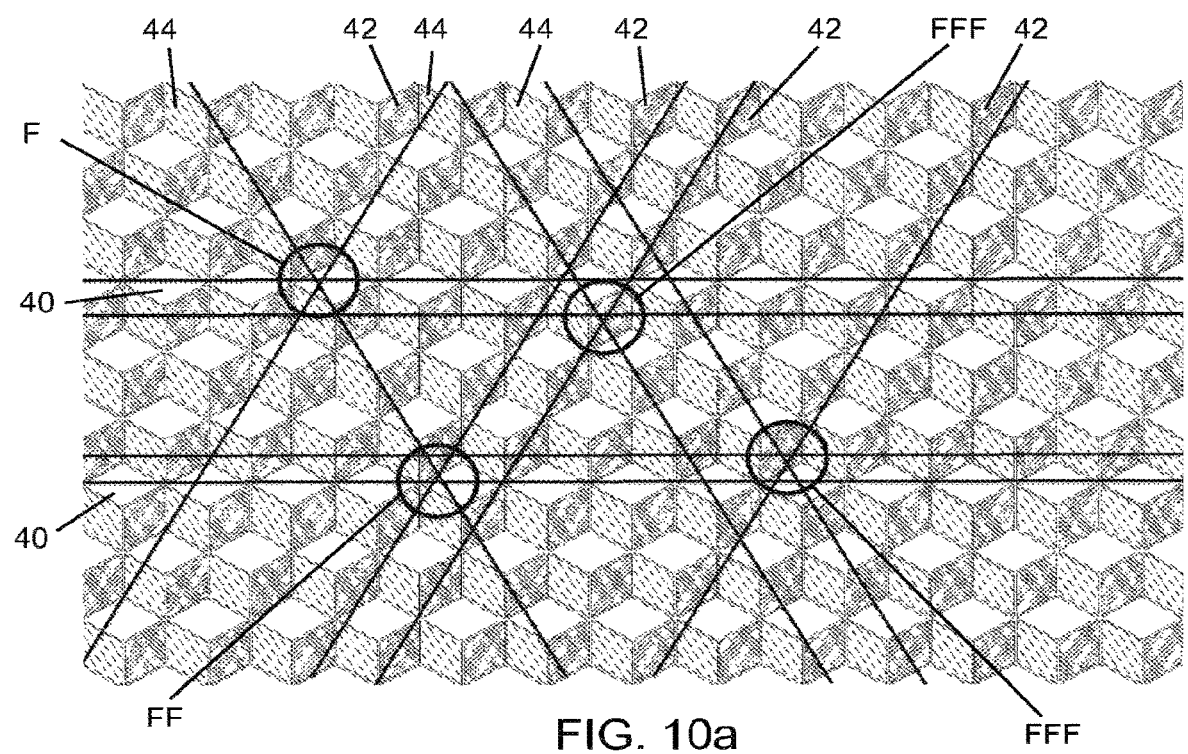
FIG. 10a is a diagram wherein circles represent finger touches and lines represent data from self-capacitance that are used in sensing finger position.
Figure 10B:
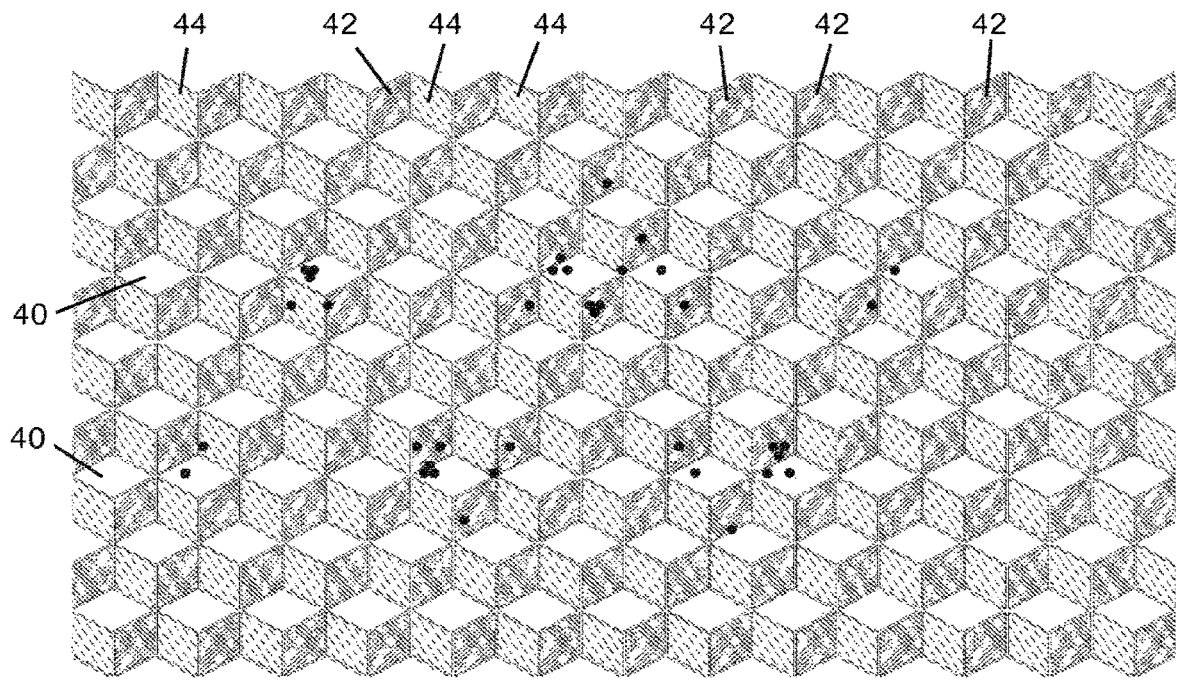
FIG. 10b is a diagram wherein the line intersections in FIG. 10a have been computed and indicated by points.
Figure 10C:
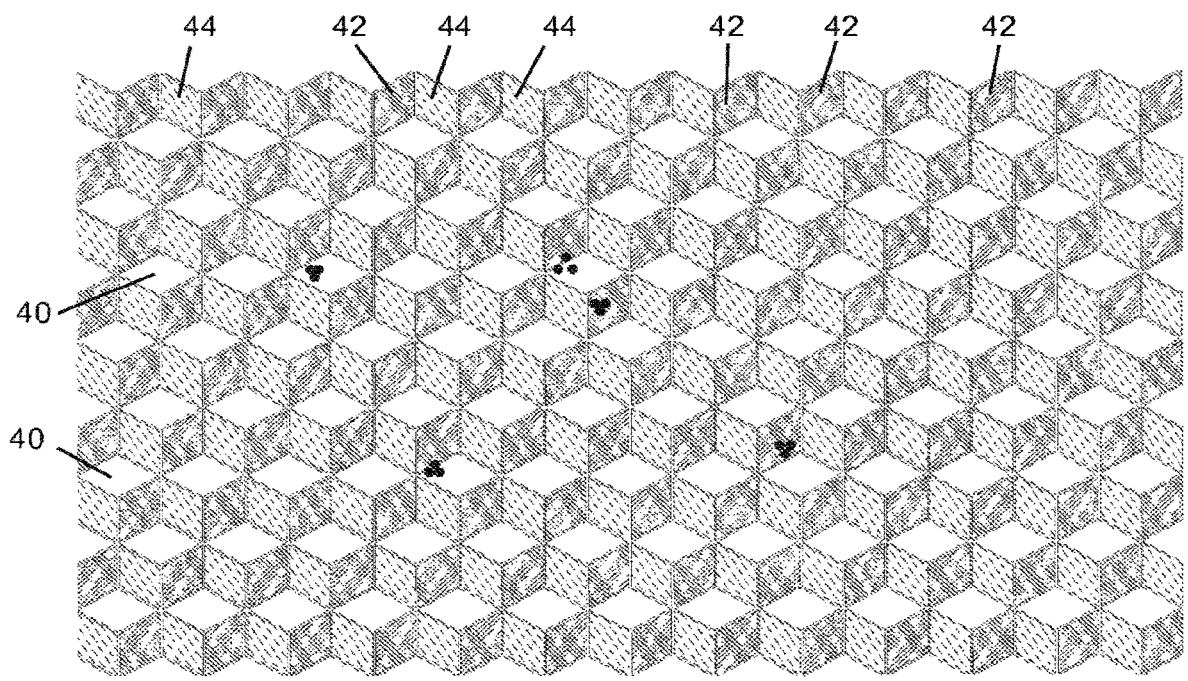
FIG. 10c is a diagram wherein a cluster analysis has been used with the computed intersections from FIG. 10b, so as to discard unlikely finger touches, and wherein a ghost remains but is of reduced magnitude.

The second approach is based on self-capacitance. Self-capacitance measurements of all the electrodes would indicate which of them were reporting finger touches (represented by a first circle F, a second circle FF, a third circle FFF, and a fourth circle FFFF), producing data similar to the solid lines shown in FIG. 10a. These lines would be found using interpolation to ensure the greatest accuracy for the self-capacitance measurements, and to disambiguate lines associated with different fingers. The locations of intersections of these lines would then be computed, as shown by the dots in FIG. 10b, and cluster analysis (e.g., via bounding boxes) would be used to determine likely finger touches, as shown in FIG. 10c where a ghost remains but is of reduced magnitude. Actual finger touches would be separated from ghosts based on the tightness of the tri-intersection cluster. As in the previous approach, temporal filtering would further help to identify and discard misidentifications or ghosts.

It also should be noted that tri-intersection can be combined with any of the other three methods to further improve disambiguation. Also, it will be appreciated that using additional sets of intersecting axes can be extended even further to quad-intersection, penta-intersection, and so forth.

Multi-Point Haptics with Mirrored Electrodes

Figure 1A:
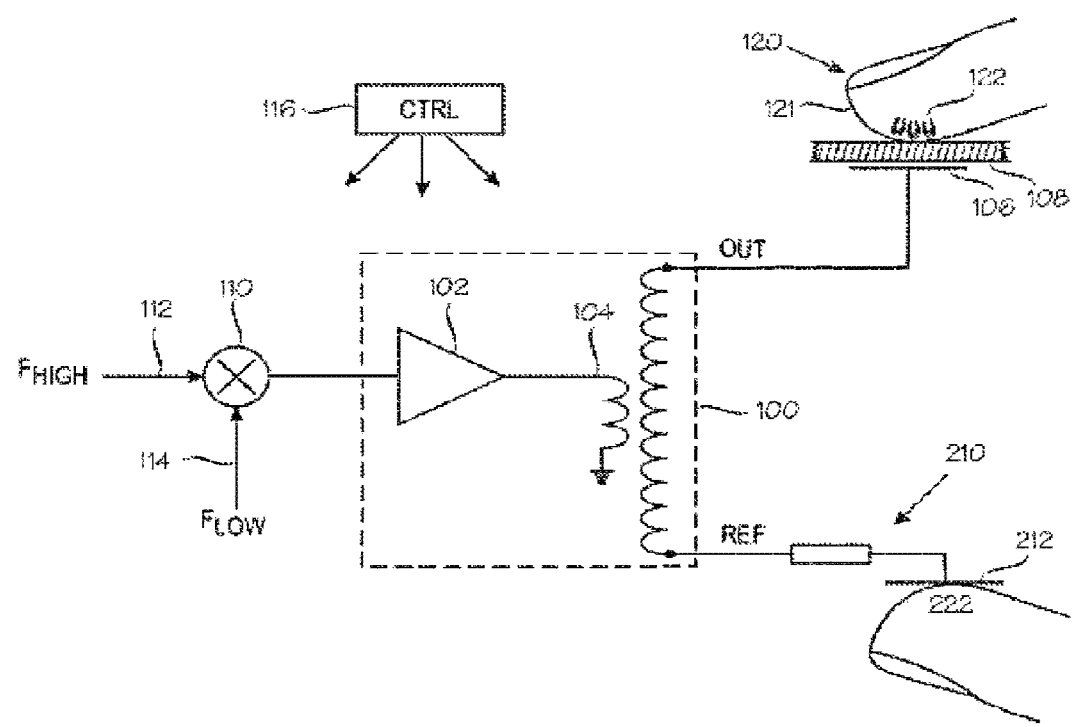
FIG. 1a is a figure from a prior art patent of an apparatus which implements a capacitive electrosensory interface, having an electrical circuit that is closed between two separate contact locations that are contacted by two different fingers.
Figure 1B:
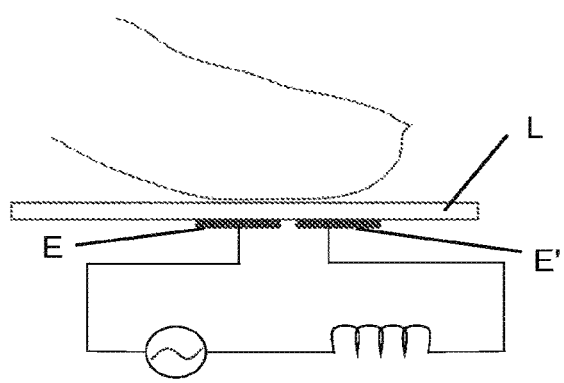
FIG. 1b is a portion of a figure from a co-pending application by the present inventors which shows closing of an electrical circuit through two different electrodes at the same contact location by a single finger.
Figure 2:
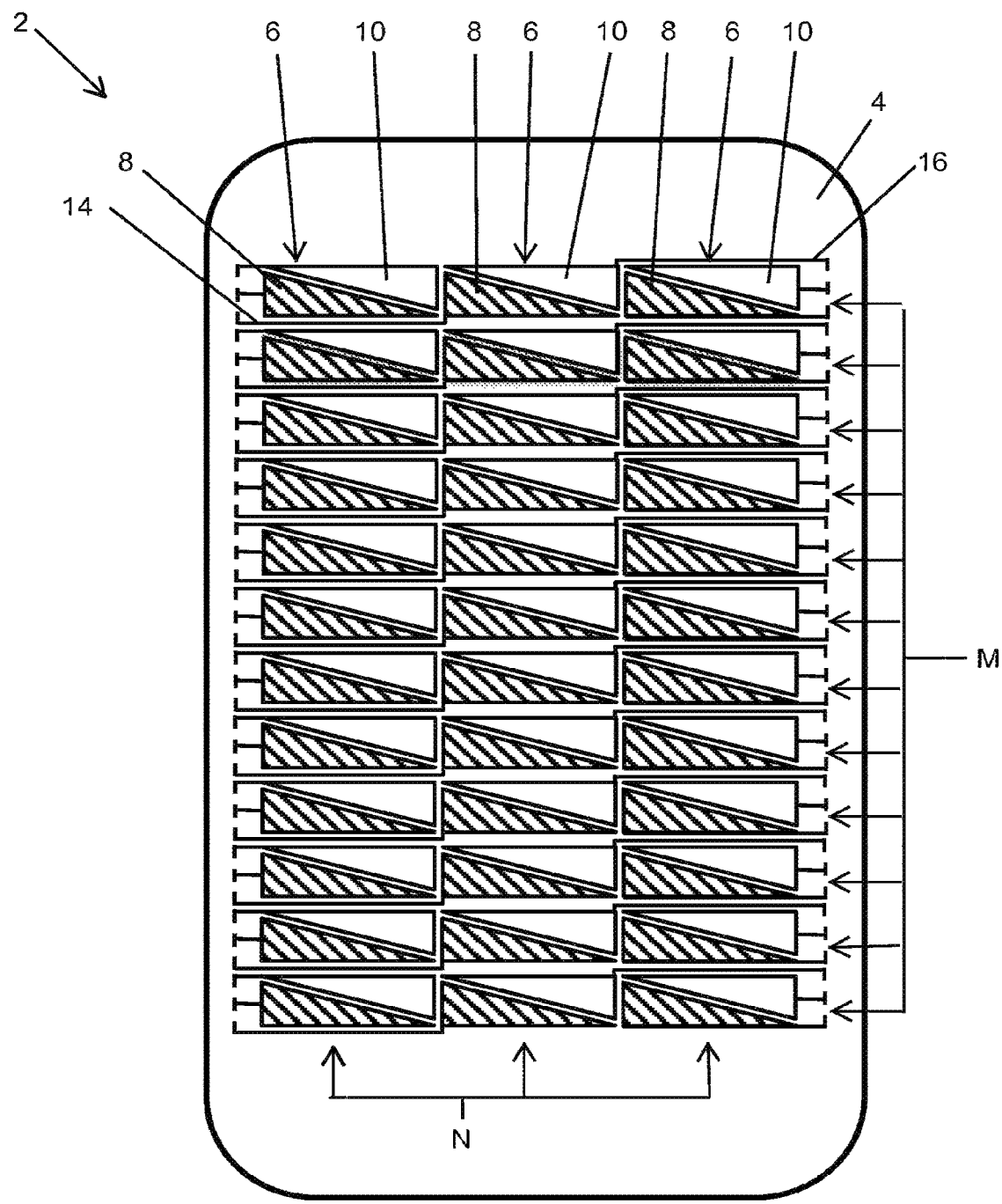
FIG. 2 is a diagram of an arrangement of electrodes for an apparatus, such as a mobile device.
Figure 3A:
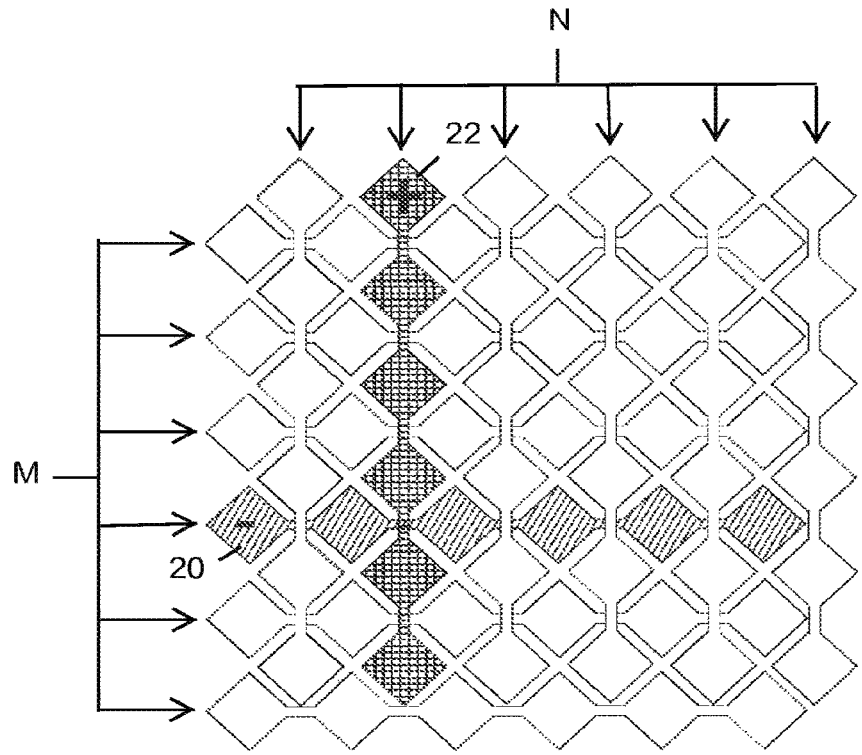
FIG. 3a is a diagram of a first example pattern of electrodes being in a lattice network.
Figure 3B:
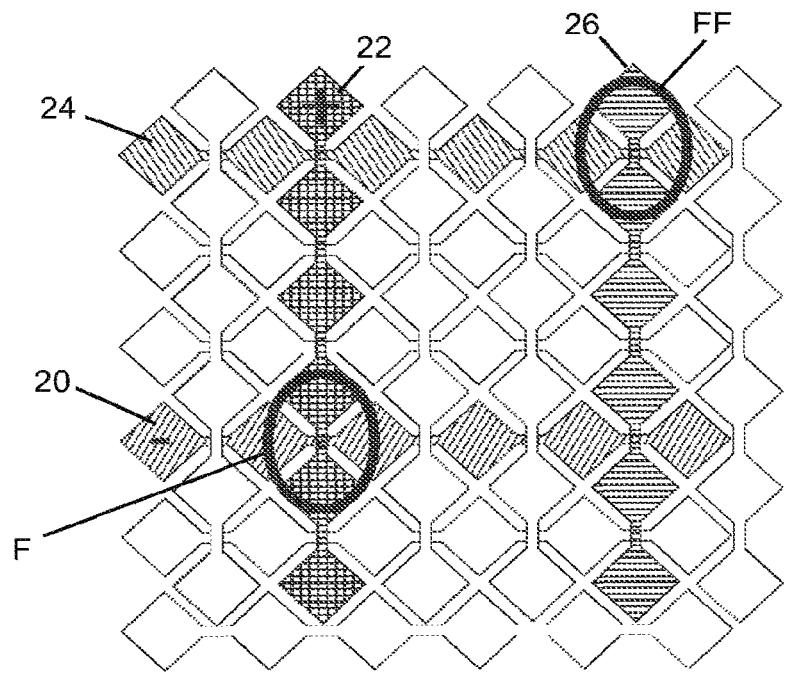
FIG. 3b is a further diagram of an example pattern of electrodes in a lattice network and showing multi-point haptics.

Multi-point haptics requires that each finger touch location lie above a pair of electrodes. Moreover, the pair of electrodes for each finger touch should be electrically isolated from those for the other fingers to ensure that haptic effects can be independently assigned. FIG. 3b shows an example of this for two fingers, but as discussed, electrical isolation is not possible when two fingers are on the same active electrode.

Figure 11:
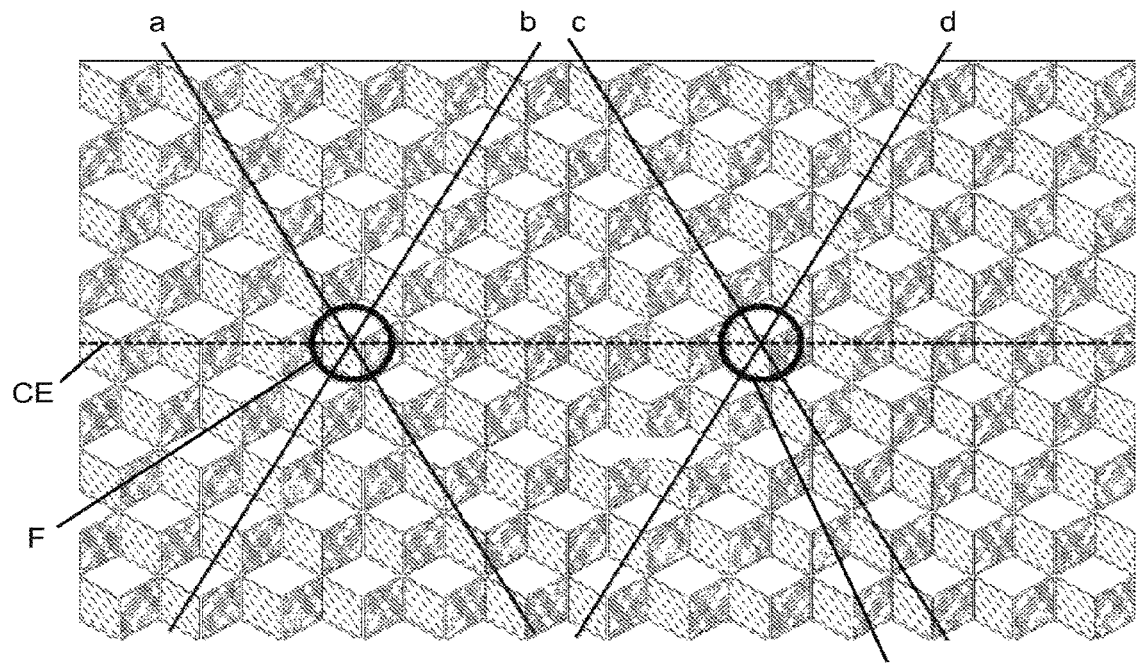
FIG. 11 is a diagram wherein circles represent two finger touches lying on the same electrode (in this illustration, the x-axis common electrode is referenced by a dashed line), where the finger touches can be addressed independently by keeping that electrode electrically isolated via a high impedance connection to ground, and forces can be applied to each finger using the other two electrodes that pass beneath it.

The tri-intersection pattern of electrodes (used above for disambiguating sensing) also provides one solution to this difficulty in haptics. With tri-intersection, there are three sets of electrodes under each finger touch, and any two of the three can be chosen as the active pair for producing an electrostatic field. As shown in FIG. 11, the finger touches (represented by a first circle F and a second circle FF) remain independently addressable even if they lie above a common electrode. In FIG. 11, the common electrode is shown by the dashed line CE, and the key is to ensure that the common electrode is not driven but rather is left at high impedance, isolated from sources or ground. This still leaves two electrodes under each finger, and these can be independently addressed.

While the active electrodes can be addressed all at once, it is best to address them sequentially as follows: electrodes c and d are isolated while a and b are connected to voltage sources of opposite polarity. Charges build up underneath the fingertip touch with a time constant governed by $C_f$ and the resistance of the electrodes. Using values discussed earlier, this time constant may be 1-10 μsec. After charges have built up under one finger touch, they can be expected to stay there for some period of time, leaking away slowly through the resistivity of the skin. Various experimental estimates suggest that the leakage time constant is greater than 100 μsec, although the exact number depends on the condition of the skin. Thus, after electrodes a and b are charged, they can be isolated while c and d are charged. Using this technique, it should be possible to cycle through approximately 10 finger touch locations, applying charge to each, without undue leakage.

Figure 12:
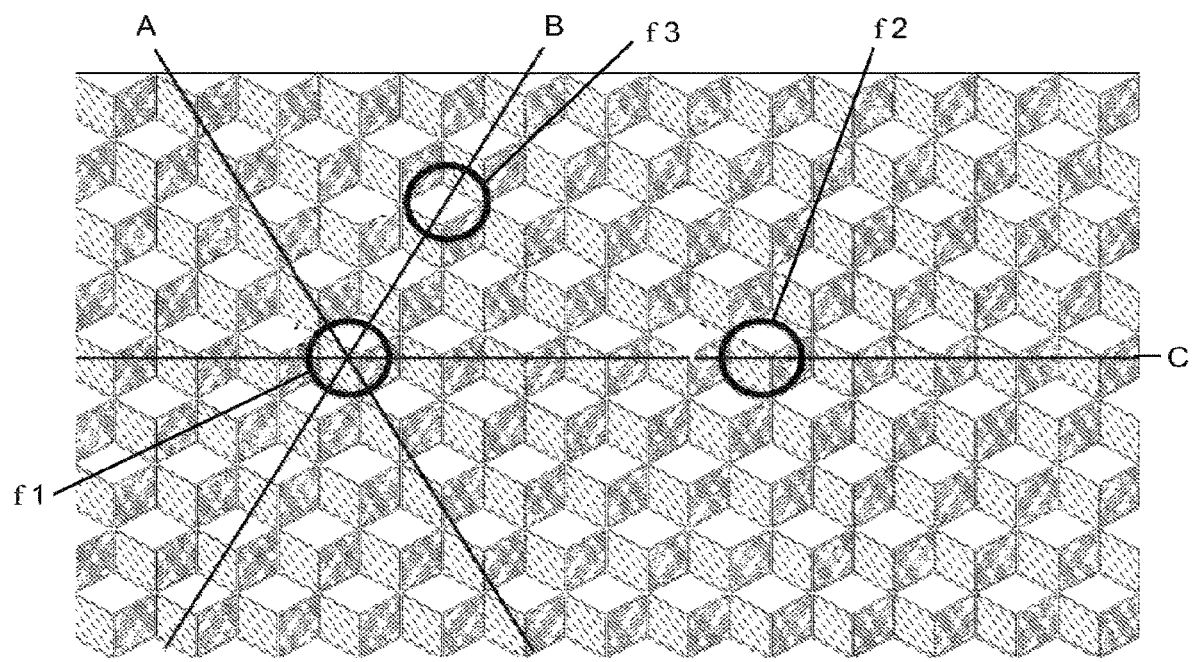
FIG. 12 is a diagram somewhat like that in FIG. 11, but showing a finger touch arrangement in which tri-intersection is inadequate to assign all forces on the three finger touches.

As with sensing, there are configurations in which independent control of haptic effects may not be feasible. FIG. 12 illustrates such a situation. Here, in addition to a first finger touch (represented by a first circle f1) there are two additional finger touches (represented by a second circle f2 and a third circle f3) which share electrodes with the finger touch f1. If an electrode A is paired with an electrode B in order to produce an electrostatic force on the finger touch f1, then force will be applied to the finger touch f3, as well. If the electrode A instead is paired with an electrode C, then force will be applied to the finger touch f2. While completely independent control is not possible with this arrangement, tri-intersection still provides some benefits. If, for instance, the electrodes A and B are paired, then the finger touch f2 is unaffected and the finger touch f3 experiences only half the force experienced by the finger touch f1 because there is only one, not two active electrodes underneath it (note the emphasis of the case in which the finger touches f2 and f3 experience lower forces than the finger touch f1, as higher forces are relatively easy to achieve since the finger touches f2 and f3 each can be addressed by two independent electrodes).

Other approaches to the situation shown in FIG. 12 are: use an electrode A and, as a second electrode, another one that is parallel to A; or, use a quad-intersection or higher-intersection geometry.

In addition, it should be understood that electrostatic haptic effects are normally experienced only when a finger is moving, so a situation like that in FIG. 12 will not persist. Finally, it should be understood that the ability of a person to distinguish a haptic sensation on one finger from that on another is limited, depending on the type of stimuli. As such, it is not always necessary to achieve complete independent control.

Simultaneous Sensing and Actuation with Mirrored Electrodes

In the methods taught herein, the front or top surface electrodes (haptic devices) are involved in both sensing and actuation (haptics). It is of course desirable to sense finger locations at the same time that haptic effects are being applied. Moreover, it is desirable that haptics not affect the quality of the sensing. Both of these goals are achieved by proper time sequencing.

When haptics is not in use, the front or top surface electrodes are normally not driven (in other words, the switches shown in FIG. 7b are open). When this is the case, it is straightforward to measure either the self-capacitance of a bottom surface electrode or the mutual capacitance of any pair of electrodes using any of a number of techniques known in the art. For instance, self-capacitance can be measured using a relaxation oscillator technique and measuring the oscillator frequency, which would typically be on the order of 1 MHz.

If it becomes necessary to produce a haptic effect, the switches in FIG. 7b would be closed long enough to charge up the finger capacitance C1. As discussed earlier, this would require typically 1-10 µs. During this interval, sensing on the mirrored bottom surface lines of electrodes would be suspended and instead those lines would be grounded. At the end of this interval, sensing would commence. Sensing could continue for up to another 90 µs while still maintaining a haptic switching loop of 10 kHz, which is typical for electrostatics. Of course, not all electrodes can be queried in parallel. Instead, sensing would be multiplexed. Up to 100 sequential sensing queries could be completed while maintaining a reasonable multi-touch sensing rate of 100 Hz.

Alternatively, the charging of the top surface electrodes can be done by injecting an amount of charge or current onto them, rather than by connecting them intermittently to a voltage source as described just previously. The distinction is one of impedance; the alternate method maintains the high impedance state of the top surface electrode (due to haptic actuation) high at all times, with the consequence that signals (for sensing) originating in the lower surface electrodes can still have their effect without being distracted by the actuation.

From the foregoing description, it will be appreciated that several additional aspects may be ascertained from this disclosure when a touch interface uses mirrored electrodes.

For instance, in another aspect, the touch interface may further comprise a strong capacitive coupling between each respective surface haptic device connected to the front surface of the substrate and each respective sensing device aligned therewith and connected to the rear surface of the substrate.

In a further aspect, the touch interface may have the pattern of the one or more surface haptic devices be identical to the pattern of the one or more sensing devices.

In another aspect, the touch interface may use surface haptic devices that are transparent, or that further include an electrode and a protective layer, where the protective layer may be transparent and/or may be made of a dielectric material.

In still a further aspect, the touch interface may use a substrate that is planar or curved, and the substrate may be transparent, such as in the form or a sheet of glass or plastic.

In another aspect, the touch interface may have the haptic devices provide a haptic effect that is a change in friction and/or is independently controllable at more than one touch location.

In a further aspect, the touch interface may include a device that provides measurements of positions of more than one touch location.

In still another aspect, the touch interface may include electrical signals that are sent to at least one of the one or more surface haptic devices to produce a haptic effect, and the electrical signals may be sent to at least one of the one or more sensing devices to measure a touch location.

In a further aspect, the touch interface may include sensing devices that remain functional when the one or more surface haptic devices is damaged.

In another aspect, the touch interface may include one or more surface haptic devices and one or more sensing devices that are arranged in substantially similar and aligned patterns with each presenting an array having two or more lines of different electrodes that present intersection locations.

In still a further aspect, the touch interface may include one or more surface haptic devices and one or more sensing devices that are arranged in substantially similar and aligned patterns presenting an array having three lines of different electrodes that present a tri-intersection pattern. In a first further related aspect, the tri-intersection may provide disambiguation of ghost images of touch locations relative to actual finger touch locations when the touch interface is used with multi-finger sensing. In a second further related aspect, the tri-intersection may provide disambiguation of at least one finger touch location of a first individual relative to at least one finger touch location of a second individual when the touch interface is used with multi-user sensing.

Simultaneous Sensing and Actuation with Only One Set of Electrodes

The technique of mirrored electrodes is advantageous because it ensures that sensing can be accomplished even if the front surface electrodes are compromised by one or more scratches. If scratches are unlikely to occur, then it may be desirable to use only one set of electrodes—those on the touch surface, to accomplish sensing and actuation. Using the techniques taught here, it is still possible to do so. In particular, the problem of disambiguating real touch locations from ghost locations may still be resolved by the methods taught here, and simultaneous sensing and actuation may still be achieved by proper timing of the haptic and sensing signals.

From the foregoing description, it will be appreciated that several additional aspects may be ascertained from this disclosure when a touch interface uses one or more electrodes connected to the front surface of a substrate that are used as one or more haptic devices and sensing devices.

For instance, in another aspect, the touch interface may include electrodes on the front surface that provide an electrostatic force, and further, the electrostatic force may have a magnitude that can be modulated.

In another aspect, the touch interface may include that the one or more electrodes connected to the front surface of a substrate that present an array having two or more lines of different electrodes that present intersection locations, and further, the array may have three lines of different electrodes that present a tri-intersection pattern, which in turn may present a touch location that is associated with a finger engaging three different electrodes within the tri-intersection pattern.

In further aspect, the touch interface may include that the electrodes connected to the front of the substrate are capable of providing multi-point haptics.

In the examples described herein, scratches to electrodes may be avoided as a problem because the insulating dielectric layer over an electrode may be of an especially hard or scratch resistant material. Or the surface material may be self-healing. Alternatively, it may be that a scratch, even though it cuts through the insulating dielectric layer, may be tolerated because the conductive layer of the electrode that is newly exposed by the scratch will be chemically changed by virtue of its exposure, and will cease to be conductive in the part that approaches the edge of the scratch. In this way, there may be no conduction from the conductive layer via the exposed scratch to a touch by a human finger at the location of the scratch on the touch interface. Also, if no essential conductive trace is transected by the scratch, then the display may continue to function adequately.

In addition, some applications may be less prone to scratches. For instance in touch interfaces such as a kiosk application of haptic display screens, or an automotive display, encounters with hard materials are much less common than, for instance, mobile phones that are often kept in a pocket or purse together with other objects. By limiting the current available to the conductive layer, conduction from a scratch to the finger also may be unproblematic.

Techniques of SSA Distinct from Use of Mirrored Electrodes

Additional new techniques for simultaneous sensing and actuation are disclosed herein, distinct from the above-described techniques using mirrored electrodes. These further new techniques can be used when electrodes are confined only to the top or touch surface. They also may be used when there are additional conductive layers, for instance on the rear surface of the substrate, or even as an internal layer of the display, where the other conductive layers may be used for other purposes.

Figure 4:
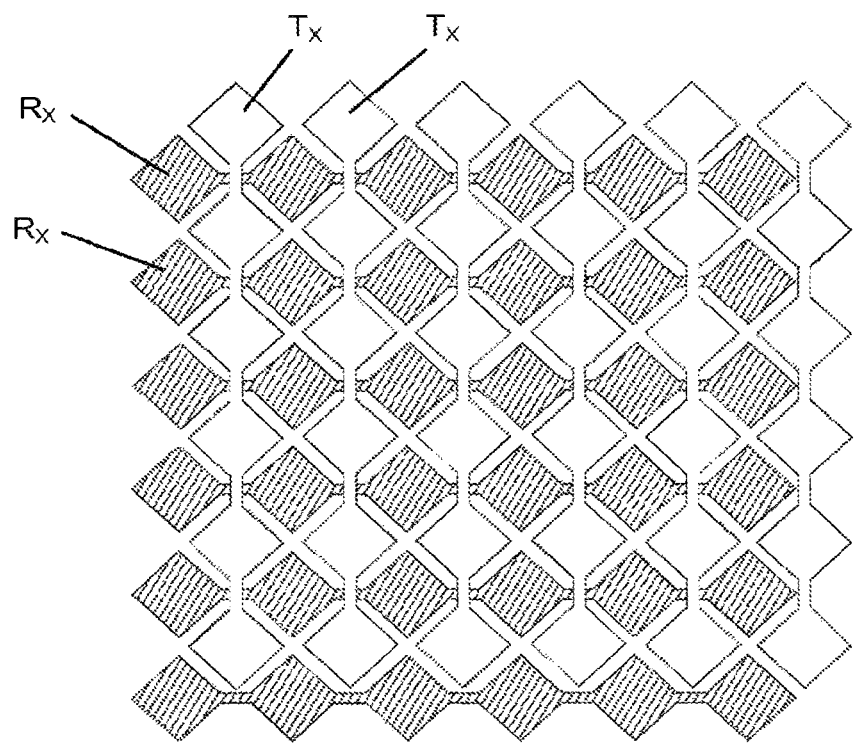
FIG. 4 is a diagram showing a diamond pattern of electrodes that may be used in pCap sensors.

In a preferred embodiment, the electrodes on the top surface of the substrate are arranged in the diamond pattern shown in FIG. 4. Bridges may be fabricated using any of a variety of known techniques, so that the line of electrodes along a first axis (for example the x-axis), and the line of electrodes along or parallel to a second axis (for example the y-axis) are electrically continuous, but no x-axis line of electrodes makes electrical connection to any other x-axis line of electrodes, or to any y-axis line of electrodes. Preferably, the diamonds of the x-axis and y-axis lines all are fabricated in the same step, for instance out of ITO, which may then be patterned. However, it also can be that the electrodes in the diamond shapes in the x-axis and y-axis lines are deposited in different steps. Different methods of constructing bridges are appropriate in these cases. The conductive x-axis and y-axis lines of electrodes in the diamond patterns are covered by an appropriate and thin layer of dielectric material. Textures may be created on the touch surface, and coatings for optical purposes such as anti-reflection, or for physical purposes such as oleophobicity, also may be applied, consistent with the sensing and actuation techniques described herein.

Electronics

Electronics are used to drive the x-axis and y-axis lines of electrodes to the potentials (voltages) needed to create perceptible, subtle or strong haptic effects, and to interrogate (measure the capacitance of) the x-axis and y-axis lines of electrodes to determine the location of one or more finger touches on the touch surface. The relatively high voltages needed for actuation, in the tens or hundreds of volts, are generally incompatible with logic levels, which typically are 5 volts or 3.3 volts. Furthermore, it is desirable to be able to apply both positive and negative voltages to an x-axis line of electrodes or to a y-axis line of electrodes, alternating in time, so that there is little or no DC component of the voltage signal on the electrodes. These alternating voltages also may be supplied according to patterns and timing algorithms, in order to create a diversity of haptic effects.

Interrogation of the x-axis and y-axis lines of electrodes for position sensing is done in a way consistent with the actuation described, so that actuation and interrogation can go on as one and the same process, or effectively simultaneously, interspersed so rapidly that no perceptible interruption of the desired pattern of haptic actuation is created, and also so that sensing of the location or presence of the one or more fingers is done very rapidly.

When an x-axis or y-axis line of electrodes is charged or discharged, the quantity of charge involved is a measure of the capacitance of the electrode. The capacitance is affected by the proximity of a finger, and also the area of the finger, and other factors. The capacitance is affected both by that part of the area of a finger which is touching or in contact with the dielectric layer over an electrode, and by, but to a lesser extent, that part of the area of a finger which is not touching or in contact with the dielectric layer but which is in proximity to it, to a diminishing degree as the finger area that is not touching is farther away. Thus, a measure of capacitance of the electrodes, in principle, can be used to interrogate the presence and position of one or more fingers.

Figure 13:
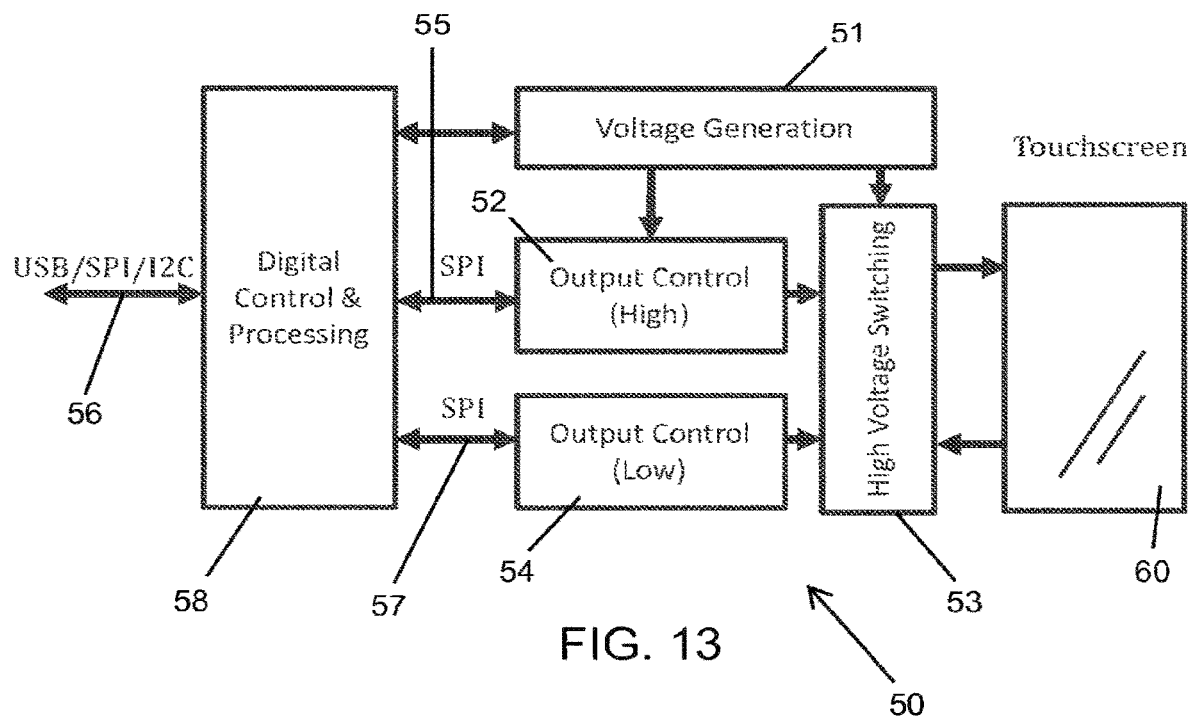
FIG. 13 is a block or flow diagram of the electronics showing several processors or ASICs communicating via serial communication, with level shifting, such that the two output control units can have "flying logic", with power supply voltages to them offset from the main digital control and processing.

Referring to FIG. 13, a block diagram is provided for the preferred embodiment of the electronic controller 50 for the haptic display system. An external host, such as a personal computer (PC), portable computing device or other embedded processor or system can communicate via a communication bus 56 to the controller 50. This communication interface could use any number of possible physical layer interfaces, such as USB, SPI or I2C. The communication will be bi-directional to allow the host to receive information, such as the touchscreen input coordinates, while also providing information such as the desired haptic output.

The communication bus 56 terminates into a digital control and processing block 58 inside the controller 50. On the control side, this block is responsible for managing the communication with the host and controlling the complex operations of the controller. On the processing side, it is responsible for interpreting the incoming haptics information and converting it into the basic data and operations required for the haptic output, as well as processing the sensed electrode capacitance data into relevant interaction information to be sent to the host. In the preferred embodiment, these functions are combined in a microcontroller unit (MCU) or general purpose processing unit (GPPU) as one digital control and processing block. In alternative embodiments each of these separate logical operations could be either combined with the rest of the controller to reside in an application specific integrated circuit (ASIC), or broken up and added as an extended part of the functionality of the host, or in some combination of these possibilities.

In a preferred embodiment for the haptics output, the host, a GPPU or other computing device conveys detailed information to the digital control and processing block 58 about the haptic effects to be output on one or more electrodes of the touch interface or touchscreen 60. In an alternate embodiment, the detailed information for the haptic effects are stored in the digital control and processing block 58 and are output depending on control commands from the host or other computing device.

Creating the haptic output effects on touchscreen 60 often requires voltages that are much higher than those typically used in digital control and processing. Therefore in order to control voltages to the electrodes of the touchscreen 60, High Voltage Switching circuitry 53 is often needed. In the preferred embodiment, each electrode output from the high voltage switching circuitry 53 is in the form of a half-bridge structure, with a hybrid option for a switch to O (ground) the output. The half-bridge structure involves one switch connecting the output to the positive voltage and one switch connecting the output to the negative voltage. The preferred embodiment would use metal-oxide-semiconductor field-effect transistors (MOSFETs) as the switches in the half-bridge and to 0. The preferred embodiment would also have all or a significant number of the high voltage transistors for both positive and negative voltage control (half-bridges and other switches), combined in a single integrated circuit. The voltages to be controlled are also often both large positive and large negative voltages, which creates the possibility of dividing the control circuitry into high positive side control and high negative side control.

There are many ways known for connecting the digital control and processing block 58 to control the high voltage switching circuitry 53, and they generally take the form of integrated circuit (IC) blocks that take the input from the digital voltage control levels and then adjust them to control the high voltage outputs. In a preferred embodiment, one IC block controls the positive output voltages to the electrodes, Output Control (High) 52, and another controls the negative output voltages to the electrodes, Output Control (Low) 54. In a preferred embodiment, Output Control (High) 52 and Output Control (Low) 54 are either MCUs or GPPUs or other digital logic devices (including programmable digital logic) surrounded with other circuitry to be "flying ICs", meaning that they are operating with a reference voltage that is not 0V (ground). In an alternative embodiment, Output Control (High) 52 and Output Control (Low) 54 are ASICs that include either or both of their functionality and the additional circuitry, or contain alternative circuitry that performs the function of allowing the control of the high voltage switching circuitry 53 by signals from the digital control and processing block 58. In such an alternative embodiment, the ASICs may also include the High Voltage Switching outputs 53, as well as perhaps including the digital control and processing block 58. In either embodiment, the high voltage switching circuitry 53 may also instead be separated from or separated with Output Control (High) 52 and Output Control (Low) 54. The high voltage switching circuitry 53 may also be discrete components and/or an array of high voltage transistors in a package.

In a preferred embodiment, the digital control and processing block 58 communicates with Output Control (High) 52 and Output Control (Low) 54 via serial communication links 55 and 57, which may be, for instance, SPI. The communication can be bidirectional, with the digital control and processing block 58 commanding certain electrodes of the touch interface 60 to be energized or not at specific times. Information from Output Control (High) 52 and Output Control (Low) 54 to the digital control and processing block 58 may convey capacitance information about the electrodes, which is determined while charging the electrode.

To control the large voltages needed, as stated previously, the logic components of Output Control (High) 52 and Output Control (Low) 54 operate from a power supply that is offset in potential from ground in the preferred embodiment.

This means that the more negative Vss power supply voltage or "ground" of the flying ICs Output Control (High) 52 and Output Control (Low) 54 are not at the same potential as the Vss of the digital control and processing block 58. An isolated positive power supply voltage Vdd or "rail" of 3.3 volts or 5 volts, can be used by each flying IC, and can be established with respect to its offset "ground" or Vss. The flying ICs Output Control (High) 52 and Output Control (Low) 54 are said to have a flying power supply, and this circuit technique is known as flying logic. Communication between the digital control and processing block 58 and the flying ICs Output Control (High) 52 and Output Control (Low) 54 by serial communication links 55 and 57 may be done by any of a number of known techniques for level shifting of logic signals.

In a preferred embodiment, the communication data on serial communication links 55 and 57 is conveyed as serial transmissions via magnetically linked inductors or transformers, with signal conditioning to clean up the logic signals to standard levels and standard rise and fall times. Other ways of level shifting and transmitting over serial communication links 55 and 57 include optical links such as optoisolators, or capacitive links which maintain the isolation of the flying logic power supply. Then, in order to set the new isolated digital supplies for Output Control (High) 52 and Output Control (Low) 54 to levels that will allow them to switch the high voltage transistors of the high voltage switching circuitry 53, either the Vdd or Vss of the isolated supply is tied to the high voltage supply output. This will cause the flying logic supply to move with the high voltage supply and set the digital outputs to known voltage levels. In the preferred embodiment, the supplies are "stacked" such that the highest (or lowest) voltage is the sum of the high voltage supply and the 3.3V or 5V logic supply. Alternatively, the supplies are in "parallel" so that the high voltage supply is the highest voltage level and the logic operates 3.3V or 5V below that supply level. Many other similar architectures and variations may be conceived, respecting the low power supply voltage requirement of logic and communication elements, while this logic is also able to control the higher voltage requirements of haptic actuation.

In the preferred embodiment, SPI serial communication is used for serial communication links 55 and 57, with three level-shifted signals needed. For both/either Output Control (High) 52 and Output Control (Low) 54, the digital control and processing block 58 sends a clock signal and a master-out slave-in (MOSI) signal, and Output Control (High) 52 and Output Control (Low) 54 each send a master-in slave-out (MISO) signal to the digital control and processing block 58. As described earlier, the x-axis and y-axis lines of electrodes of the front surface of the touch interface 60 generally are alternated in polarity, at a relatively high frequency (e.g., 20 KHz) when they are intended to be producing a haptic effect. In the preferred embodiment, the serial communication on serial communication links 55 and 57 is fast enough to send several bytes for each 25 microsecond half-period, specifying to each of Output Control (High) 52 and Output Control (Low) 54 which of the electrodes should be energized and with what polarity. If the system cannot meet this timing, an alternate embodiment exists where the modulation frequency will be less that the alternating frequency used to produce the haptics sensation.

In the preferred embodiment, one bit in the haptics output bit stream that is transmitted over serial communication links 55 and/or 57 contains the instruction for one electrode, but in alternative embodiments, more bits may be needed. In the case of a single bit per electrode, a value of 1 would mean that the electrode should be energized, while a bit value of O means there should be no output. Alternately, more heavily coded transmissions may be used to reduce the number of bits that need be transmitted for each cycle. Many such coding and compression methods are known. Additional bits can be used to convey and control many factors, for example, the duration of actuation of each electrode of the touch interface.

To avoid excessive currents (known as shoot through) as the polarity of an actuated electrode is reversed, it is necessary that the timing of the control to the high voltage switching circuitry 53 be coordinated so that one switch of the half-bridge ceases to actuate an electrode (e.g. open the positive switch) before the other commences to actuate the same electrode (e.g., closing the negative switch). Additional transmitted bits on serial communication links 55 and 57 can be used to convey the duration of actuation of each electrode within each 50 microseconds period so that there is no shoot through. In the preferred embodiment, the individual MOSI line going to Output Control (High) 52 and Output Control (Low) 54 is used to communicate this information, and these connections also include a Slave Select to both/each of Output Control (High) 52 and Output Control (Low) 54. After receiving instructions over serial communication links 55 and 57, during which Slave Select is asserted, the Slave Select is de-asserted and the electrodes will drive in the indicated directions for 25 microseconds. In the meantime, the Slave Select will be asserted again and the digital control and processing block 58 will then look for a change on the MISO line from Output Control (High) 52 and Output Control (Low) 54, indicating that the electrodes are no longer driven. Once again, the Slave Select lines are de-asserted, causing the opposite drive on the electrodes. Finally, the Slave Select line is re-asserted, the next commands are sent over the SPI bus (serial communication links 55 and 57) and then the SPI master (58) looks for the completion of the cycle when it will see a change in the MISO line.

In an alternate method, the moment of receipt of the first byte of a packet of instructions from the digital control and processing block 58, received by both Output Control (High) 52 and Output Control (Low) 54, is used as a start signal. In the closest timing situation, a given electrode is actuated positive for almost all of the first 25 microseconds of a 50 microseconds period, and then negative for almost all of the second half of that period. If an electrode output is commanded to be actuated for fewer microseconds to produce a less intense haptic effect on the touch surface of the touch interface 60, the timing issue is less exacting. Output Control (High) 52 and Output Control (Low) 54 commence to time from the moment of receipt of the first SPI byte over serial communication links 55 and 57. The flying IC that actuates first ceases to do so prior to the 25 microseconds mark, by an appropriate margin of safety of for instance 1 microsecond, while the flying IC that actuates in the second half of the period commences to do so after the 25 microseconds mark by an appropriate margin of safety. Other techniques for avoiding shoot through may also be applied.

Each of Output Control (High) 52 and Output Control (Low) 54 drives a number of high voltage transistors such as MOSFETs in the preferred embodiment. Output Control (High) 52 drives p-channel MOSFETs and the Output Control (Low) 54 drives n-channel MOSFETs. Also in this preferred embodiment for the high voltage switching circuitry 53 each output switch for each electrode implements current limiting by use of a source resistor with the MOSFET, with a value of typically 100 ohms. This independently limits the actuation current to each electrode at a maximum value of typically about 10 mA. Alternatively, a single source resistor can be used for all or a subset of the MOSFETs, thus limiting the actuation current for all or for a subset of the electrodes, collectively.

One aspect of the invention is to measure electrode capacitances and from that information to determine the position and proximity, and intimacy of contact or touching of the touch screen 60 of one or more fingers, while at the same time as conducting the measurement, also continuing to produce haptic perceptions without discernable interruption. In a preferred embodiment, capacitance of each electrode on the touch interface 60 is measured while the electrode is being actuated by the high voltage switching circuitry 53. Circuitry and software associated with the Voltage Generation 51 as well as Output Control (High) 52, Output Control (Low) 54 and potentially the digital control and processing block 58 measures the current that is flowing to an electrode while it is being actuated, that is, charged, and this current is proportional to the electrode's capacitance. In a preferred embodiment, the current is integrated on a capacitor that intercepts the charging current, with the capacitor being common to all the MOSFETs and electrodes. After actuation of one or more electrodes, the voltage across the capacitor is read by the analog-to-digital converter (ADC) of Output Control (High) 52 or Output Control (Low) 54, depending on which voltage it is associated with. In a preferred embodiment, that capacitor voltage is read directly by the ADC, while in an alternative embodiment it is amplified prior to being read by the ADC. In another alternative embodiment, the charging current is intercepted not by a capacitor, but rather by a resistor, and the voltage across the resistor is read intermittently by the ADC while current flows to the electrode. The sum of these readings approximates the integral of the current, which is the same physical quantity as the charge across the previously mentioned capacitor. In another embodiment, the voltage across the resistor is integrated over time in the analog domain with optional amplification before, during or after the integration stage. This also provides the integral of the current which is the charge across the capacitor.

Figure 14:
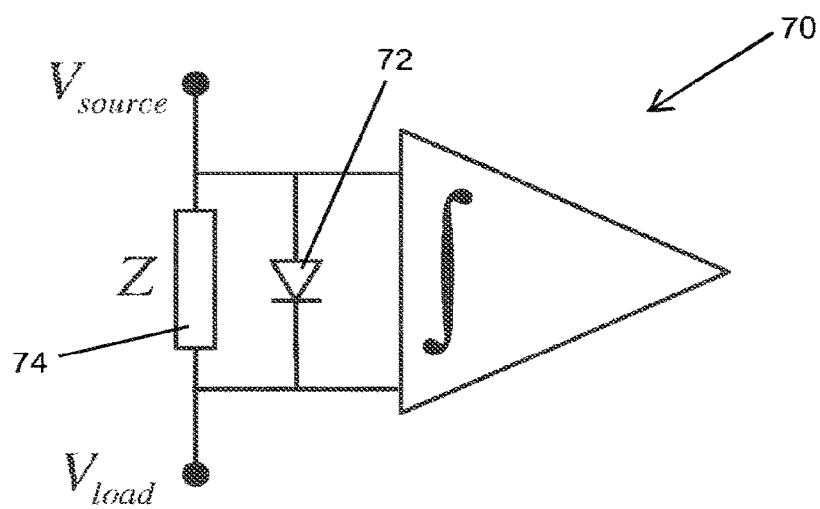
FIG. 14 is a diagram of the charging current monitor, showing a diode that is used to prevent excessively reducing gate drive voltages.

In a preferred embodiment, the capacitance of an electrode is read both when it is actuated positive and again when it is actuated negative, and these two readings are summed, to obtain greater signal and cancel some sources of noise. In an alternative embodiment, capacitance is measured in only one of these phases, for instance the positive. FIG. 14 illustrates a component of a preferred circuit embodiment. More particularly, FIG. 14 provides an embodiment of a charging current monitor 70, showing a diode 72 that is used to prevent excessively reducing gate drive voltages. The diode 72 is placed in parallel with a capacitor or resistor 74, to limit the voltage that develops to approximately 0.6 volts, with the purpose of not excessively reducing the gate drive voltage of the MOSFETs in the case of large electrode charging currents.

Figure 15:
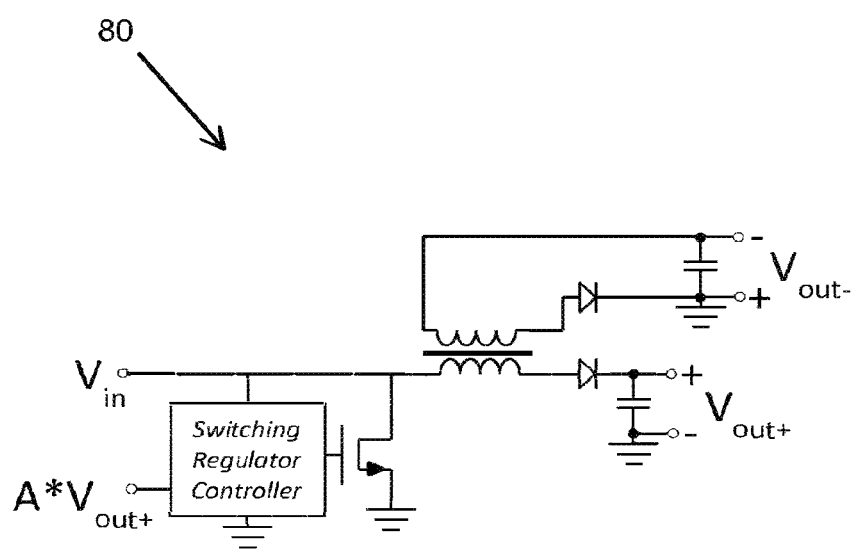
FIG. 15 is a diagram of a dual high voltage output switching regulator.

Another aspect of the invention is the efficient synthesis of the positive and negative voltages needed for haptic actuation, which are in the tens or hundreds of volts. This is part of the Voltage Generation block shown in FIG. 13 as 51. Much computing equipment to which the invention will be applicable will be primarily battery powered and the voltage available from such batteries is smaller than that typically needed for haptic actuation. Boost converters are well known in the art, as are other types of converters, which efficiently produce an output voltage higher than their input voltage. An aspect of the invention is the adequacy of a two-output boost converter, because the haptic effects depend sensitively on the large difference of potential between the positive and negative actuation voltages, but do not depend much on the symmetry of them. Thus, in FIG. 15, a boost converter 80 with two outputs, derived from an inductor wound with two output coils, is usable even though only the sum of the two voltages' magnitude is regulated, and the difference is not regulated. In a preferred embodiment, a double output boost converter is used for the actuation voltages. Also in a preferred embodiment, the logic voltages for the flying ICs (typically 3.3 volts or 5 volts) are derived from a third and a fourth windings on said inductor, and then these are series regulated to accurate voltages in a conventional way. In an alternative embodiment, separate regulated converters are used to derive the logic voltages. These may be of many types known in the art, such as ones that are integrated with signal level shifters as well. In another alternative embodiment, separate converters are used for the positive and negative haptic actuation voltages. Other power supply techniques that are known in the art may also be used.

From the above disclosure, it will be apparent that touch interface devices constructed in accordance with this disclosure may provide multi-point haptics while including a number of advantages over the prior art. The devices may exhibit one or more of the above-referenced potential advantages, depending upon the specific design and configuration chosen.

It will be appreciated that a touch interface of a surface haptic device having multi-point haptics in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such devices without departing from the scope or spirit of the claimed subject matter, and that the claims are not limited to the preferred embodiments illustrated herein.

It is to be understood that the above description is intended to be illustrative, and not restrictive. For example, the above-described examples or embodiments (and/or aspects thereof) may be used individually or in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are intended as examples. Many other embodiments will be apparent to one of ordinary skill in the art upon reviewing the above description. The scope of the one or more embodiments of the subject matter described herein should, therefore, be determined with reference to the appended claims, along with the full scope of equivalents to which such claims are entitled. In the appended claims, terms such as "including" and "having" are used as the plain-English equivalents of the respective terms "comprising" and "wherein." Moreover, in the following claims, use of terms such as "first," "second," and "third," etc. may be used merely as labels, and are not intended to impose numerical requirements on their objects. Further, the limitations of the following claims are not written in means-plus-function format and are not intended to be interpreted based on 35 U.S.C. 112, sixth paragraph, unless and until such claims limitations expressly use the phrase "means for" followed by a statement of function void of further structure.

This written description uses examples to disclose several embodiments of the inventive subject matter, and also to enable a person of ordinary skill in the art to practice the embodiments disclosed herein, including making and using any devices or systems and performing any incorporated methods. The patentable scope of the subject matter may be defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of said elements or steps, unless such exclusion is explicitly stated. Furthermore, references to one example of embodiment of the presently described inventive subject matter are not intended to be interpreted as excluding the existence of additional examples or embodiments that also incorporate the recited features. Moreover, unless explicitly stated to the contrary, claims "comprising," "including," or "having" an element or a plurality of elements having a particular property may include additional such elements not having that property.

The invention claimed is:

1. A haptic touch interface having simultaneous sensing and actuation comprising:
   an insulating substrate comprising a front surface and a rear surface;
   an array of front surface electrodes connected to and disposed on the front surface of the substrate,
   wherein the array of front surface electrodes making up a haptic layer of the haptic touch interface are arranged in a first aligned pattern; and
   an array of rear surface electrodes connected to and disposed on the rear surface of the substrate,
   wherein the array of rear surface electrodes making up a sensing layer of the haptic touch interface are arranged in a second aligned pattern that is substantially identically configured to and substantially mirrors the first pattern,
   wherein the front surface electrodes have a substantial mutual capacitance with the rear surface electrodes; and
   wherein flying logic operating with a non-zero reference voltage offset from main digital control and processing is used to control voltages applied to at least one of the front and rear surface electrodes.

2. The haptic touch interface of claim 1 wherein serial communication is used, via level shifters, to coordinate the flying logic with a main processor.

3. The haptic touch interface of claim 2 wherein timing of voltages applied to at least one of the front and rear surface electrodes is synchronized by a level shifted logic signal.

4. The haptic touch interface of claim 2 wherein the timing of voltages applied to at least one of the front and rear surface electrodes is synchronized by a time of arrival of a serial communication signal.

5. The haptic touch interface of claim 1 further comprising an electronic controller, wherein the electronic controller uses flying logic to control voltages applied to at least one of the front and rear surface electrodes.

6. The haptic touch interface of claim 5 wherein the electronic controller comprises a high voltage switching circuitry in electrical communication with the rear surface electrodes and a main processor, wherein the main processor is configured to control the high voltage switching circuitry.

7. The haptic touch interface of claim 6 wherein the electronic controller further comprises at least one flying integrated circuit, wherein the flying integrated circuit is configured to receive an input from the main processor to control the high voltage switching circuitry.

8. A haptic touch device comprising:
an insulating substrate comprising a front surface and a rear surface;
an array of front surface electrodes connected to and disposed on the front surface of the substrate,
wherein the array of front surface electrodes making up a haptic layer of the haptic touch device are arranged in a first aligned pattern; and
an array of rear surface electrodes connected to and disposed on the rear surface of the substrate,
wherein the array of rear surface electrodes making up a sensing layer of the haptic touch device are arranged in a second aligned pattern that is substantially identically configured and substantially mirrors the first aligned pattern,
wherein the front surface electrodes have a substantial mutual capacitance with the rear surface electrodes; and
an electronic controller, the electronic controller comprising a high voltage switching circuitry in electrical communication with the array of front surface electrodes, the array of rear surface electrodes, and a main processor,
wherein the main processor is configured to control the high voltage switching circuitry through a flying integrated circuit operating with a non-zero reference voltage offset from main digital control and processing.

9. The haptic touch interface of claim 8 wherein the flying integrated circuit is configured to receive an input from the main processor to control the high voltage switching circuitry.

10. The haptic touch interface of claim 8 wherein the flying integrated circuit has a reference voltage that is not 0 volts.

11. The haptic touch interface of claim 8 wherein the main processor is further configured to control application of a voltage to at least one of the front and rear surface electrodes.

12. The haptic touch interface of claim 8 wherein the flying integrated circuit comprises a first flying integrated circuit and a second flying integrated circuit, wherein the first flying integrated circuit controls positive output voltages applied to the rear surface electrodes and the second flying integrated circuit controls negative output voltages applied to the rear surface electrodes.

13. The haptic touch interface of claim 8 wherein the main processor communicates with the flying integrated circuit via a serial communication link.

14. The haptic touch interface of claim 13 wherein the serial communication link comprises magnetically linked inductors.

15. The haptic touch interface of claim 8 wherein the main processor communicates with the flying integrated circuit using serial communication via level shifters.

16. The haptic touch interface of claim 8 wherein the flying integrated circuit receives a power supply voltage that is offset in potential from ground.

17. The haptic touch interface of claim 16 wherein the power supply voltage received by the flying integrated circuit is offset from the power supply voltage received by the main processor.

* * * * *